US011893862B2

(12) United States Patent
Bouvier et al.

(10) Patent No.: US 11,893,862 B2
(45) Date of Patent: Feb. 6, 2024

(54) GAMING MACHINE AND METHOD WITH DYNAMIC GAME PROGRESSION

(71) Applicant: LNW Gaming, Inc., Las Vegas, NV (US)

(72) Inventors: George Bouvier, Henderson, NV (US); Kimberly Cohn, Las Vegas, NV (US); John Kearns, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 38 days.

(21) Appl. No.: 17/574,855

(22) Filed: Jan. 13, 2022

(65) Prior Publication Data

US 2023/0050242 A1 Feb. 16, 2023

Related U.S. Application Data

(60) Provisional application No. 63/232,802, filed on Aug. 13, 2021.

(51) Int. Cl.
*G07F 17/32* (2006.01)
*G07F 17/34* (2006.01)

(52) U.S. Cl.
CPC .......... *G07F 17/3267* (2013.01); *G07F 17/34* (2013.01)

(58) Field of Classification Search
CPC .............................. G07F 17/3267; G07F 17/34
See application file for complete search history.

(56) References Cited

U.S. PATENT DOCUMENTS

| | | | | |
|---|---|---|---|---|
| 3,733,075 | A | 5/1973 | Hooker et al. | |
| 5,342,047 | A | 8/1994 | Heidel et al. | |
| 5,356,140 | A | 10/1994 | Dabrowski et al. | |
| 5,393,061 | A | 2/1995 | Manship et al. | |
| 5,704,835 | A | 1/1998 | Dietz | |
| 5,833,537 | A | 11/1998 | Barrie | |
| 5,951,397 | A | 9/1999 | Dickinson | |
| 6,056,642 | A | 5/2000 | Bennett | |
| 6,186,894 | B1 * | 2/2001 | Mayeroff | G07F 17/34 463/16 |
| 6,517,433 | B2 | 2/2003 | Loose et al. | |

(Continued)

FOREIGN PATENT DOCUMENTS

| | | | |
|---|---|---|---|
| AU | 2015210489 | A1 | 2/2016 |
| GB | 2097160 | B | 5/1984 |

(Continued)

*Primary Examiner* — Justin L Myhr

(57) ABSTRACT

A gaming system comprises game-logic circuitry and a display device configured to display an active array of symbol positions. The game-logic circuitry establishes award levels having respective awards and respective array sizes and establishes a predefined path defining progression through the award levels. The display device selectively populates the active array with symbols through one or more game cycle outcomes, updates, in response to detecting a branching condition within the game cycle outcomes, the predefined path to a modified path such that progression from the first award level is altered from a second award level to a third award level, and, in response to progressing from the first award level to the third award level based on the modified path: (i) modifies the active array to the array size of the third award level, and (ii) repeats the selective population for one or more additional game cycle outcomes.

20 Claims, 22 Drawing Sheets

(56) References Cited

U.S. PATENT DOCUMENTS

| | | | |
|---|---|---|---|
| 6,641,477 | B1 | 11/2003 | Dietz |
| 6,910,962 | B2 | 6/2005 | Marks et al. |
| 7,018,293 | B2 | 3/2006 | Brown et al. |
| 7,503,847 | B2 | 3/2009 | Baerlocher |
| 7,553,231 | B2 | 6/2009 | Rodgers et al. |
| 7,604,538 | B2 | 10/2009 | Pacey |
| 7,654,895 | B2 | 2/2010 | Pacey |
| 8,057,295 | B2 | 11/2011 | Vann et al. |
| 8,057,303 | B2 | 11/2011 | Rasmussen et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,192,275 | B2 | 6/2012 | Aoki et al. |
| 8,226,459 | B2 | 7/2012 | Barrett et al. |
| 8,287,357 | B2 | 10/2012 | Evans |
| 8,323,091 | B2 | 12/2012 | Frank et al. |
| 8,357,041 | B1 | 1/2013 | Saunders |
| 8,366,538 | B1 | 2/2013 | Saunders et al. |
| 8,371,930 | B1 | 2/2013 | Saunders et al. |
| 8,414,380 | B2 | 4/2013 | Saunders et al. |
| 8,465,358 | B2 | 6/2013 | Kemper |
| 8,496,522 | B2 | 7/2013 | Caputo et al. |
| 8,512,138 | B2 | 8/2013 | Saunders |
| 8,523,659 | B2 | 9/2013 | Evans |
| 8,574,059 | B2 | 11/2013 | Rodgers et al. |
| 8,608,545 | B2 | 12/2013 | Arora et al. |
| 8,662,986 | B2 | 3/2014 | Rodgers et al. |
| 8,690,660 | B2 | 4/2014 | Saunders et al. |
| 8,790,169 | B2 | 7/2014 | Saunders |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |
| 9,165,433 | B2 | 10/2015 | Caputo |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,269,213 | B2 * | 2/2016 | Decasa ............... G07F 17/3232 |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,483,900 | B2 | 11/2016 | Aoki et al. |
| 9,870,672 | B2 | 1/2018 | Guerrero |
| 2004/0038736 | A1 | 2/2004 | Bryant et al. |
| 2007/0060248 | A1 | 3/2007 | Rodgers et al. |
| 2007/0060261 | A1 | 3/2007 | Gomez |
| 2007/0087806 | A1 | 4/2007 | Luciano et al. |
| 2007/0117607 | A1 | 5/2007 | Olive |
| 2007/0202943 | A1 | 8/2007 | Thomas |
| 2007/0232379 | A1 | 10/2007 | Falciglia |
| 2009/0124361 | A1 * | 5/2009 | Gilmore .............. G07F 17/3262 463/26 |
| 2009/0291741 | A1 | 11/2009 | Schofield |
| 2009/0325678 | A1 | 12/2009 | Gomez |
| 2010/0016061 | A1 | 1/2010 | Gomez et al. |
| 2010/0075737 | A1 | 3/2010 | Bluemel |
| 2011/0201403 | A1 | 8/2011 | Jaffe et al. |
| 2013/0065663 | A1 | 3/2013 | Johnson et al. |
| 2013/0252699 | A1 | 9/2013 | Nauman et al. |
| 2013/0310149 | A1 | 11/2013 | Meyer |
| 2016/0042597 | A1 | 2/2016 | Olive |
| 2017/0372558 | A1 | 12/2017 | You et al. |
| 2018/0033253 | A1 | 2/2018 | Vann et al. |
| 2018/0268659 | A1 | 9/2018 | Chesworth et al. |
| 2019/0172305 | A1 * | 6/2019 | Maya .................. G07F 17/3213 |
| 2019/0304255 | A1 * | 10/2019 | San ......................... G07F 17/34 |
| 2020/0027311 | A1 * | 1/2020 | Fong ................... G07F 17/3267 |
| 2021/0256812 | A1 | 8/2021 | Kearns et al. |

FOREIGN PATENT DOCUMENTS

| | | |
|---|---|---|
| GB | 2144568 B | 9/1985 |
| GB | 2251112 A | 6/1992 |

* cited by examiner

GAMING MACHINE AND METHOD WITH DYNAMIC GAME PROGRESSION

CROSS-REFERENCE TO RELATED APPLICATIONS

This application claims the benefit of priority to U.S. Provisional Patent Application No. 63/232,802, filed Aug. 13, 2021, the contents of which are incorporated herein by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2021, SG Gaming, Inc.

FIELD OF THE INVENTION

The present invention relates to a technological improvement to gaming systems, apparatus, and methods by providing a new and improved level of game play that uses new and improved animations and, more particularly, to a feature with dynamic game progression through symbol collection and/or array expansion.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

In one aspect of the present disclosure, a gaming system comprises a gaming machine primarily dedicated to playing at least one casino wagering game and game-logic circuitry. The gaming machine includes an electronic display device configured to display an active array of symbol positions. The game-logic circuitry establishes a plurality of award levels including a first award level and a second award level. Each award level has a respective award and a respective trigger condition associated with a number of trigger symbols. At least some of the awards are jackpot awards. The game-logic circuitry causes the electronic display device to selectively populate the active array of symbol positions with one or more symbols through one or more game cycle outcomes, causes, in response to concluding the game cycle outcomes without collecting a first predetermined number of trigger symbols, the electronic display device to provide a first jackpot award associated with the first award level, causes, in response to collecting the first predetermined number of trigger symbols associated with the second award level within the game cycle outcomes, the electronic display device to: (i) expand the active array to include additional symbols positions and (ii) repeat the selective population for one or more additional game cycle outcomes with the expanded active array. None of the trigger symbols that appear in the active array are carried over to the expanded active array. The game-logic circuitry also causes, in response to concluding the one or more additional game cycle outcomes without collecting a second predetermined number of trigger symbols, the electronic display device to provide a second jackpot award associated with the second award level. At least one of the first jackpot award and the second jackpot award is increased from a respective initial jackpot value to a respective updated jackpot value based at least partially on award values of value-bearing symbols populating the active array through the game cycle outcomes. The value-bearing symbols include award indicia visually indicating the respective award value. The gaming system may be incorporated in its entirety into a gaming machine in some embodiments.

In another aspect of the present disclosure, a method of conducting and presenting a game using a gaming system is provided. The gaming system comprises game-logic circuitry and a gaming machine primarily dedicated to playing at least one casino wagering game, the gaming machine including an electronic display device configured to display an active array of symbol positions. The method is at least partially performed by the game-logic circuitry. The method comprises establishing a plurality of award levels including a first award level and a second award level such that each award level has a respective award and a respective trigger condition associated with a number of trigger symbols, causing the electronic display device to selectively populate the active array of symbol positions with one or more symbols through one or more game cycle outcomes, causing, in response to concluding the one or more game cycle outcomes without collecting a first predetermined number of trigger symbols, the electronic display device to provide a first jackpot award associated with the first award level, causing, in response to collecting the first predetermined number of trigger symbols associated with the second award level within the one or more game cycle outcomes, the electronic display device to: (i) expand the active array to include additional symbols positions and (ii) repeat the selective population for one or more additional game cycle outcomes with the expanded active array, wherein none of the trigger symbols that appear in the active array are carried over to the expanded active array, and causing, in response to concluding the one or more additional game cycle outcomes without collecting a second predetermined number of trigger symbols, the electronic display device to provide a second jackpot award associated with the second award level. At least one of the first jackpot award and the second jackpot award is increased from a respective initial jackpot value to a respective updated jackpot value based at least partially on award values of value-bearing symbols populating the active array through the one or more game cycle outcomes, each of the value-bearing symbols including award indicia visually indicating the respective award value.

In a further aspect of the present disclosure, a gaming machine primarily dedicated to playing at least one casino wagering game is provided. The gaming machine comprises an electronic display device configured to display an active array of symbol positions and game-logic circuitry. The game-logic circuitry establishes a plurality of award levels including a first award level and a second award level such that each award level has a respective award and a respective trigger condition associated with a number of trigger symbols, causes the electronic display device to selectively populate the active array of symbol positions with one or more symbols through one or more game cycle outcomes, causes, in response to concluding the game cycle outcomes without collecting a first predetermined number of trigger symbols associated with the second award level, the electronic display device to provide a first jackpot award associated with the first award level, causes, in response to collecting the first predetermined number of trigger symbols within the one or more game cycle outcomes, the electronic display device to: (i) expand the active array to include additional symbols positions and (ii) repeat the selective population for one or more additional game cycle outcomes with the expanded active array, wherein none of the trigger symbols that appear in the active array are carried over to the expanded active array, and causes, in response to concluding the one or more additional game cycle outcomes without collecting a second predetermined number of trigger symbols, the electronic display device to provide a second jackpot award associated with the second award level. At least one of the first jackpot award and the second jackpot award is increased from a respective initial jackpot value to a respective updated jackpot value based at least partially on award values of value-bearing symbols populating the active array through the one or more game cycle outcomes, each of the value-bearing symbols including award indicia visually indicating the respective award value.

In yet another aspect of the present disclosure, a gaming system comprises a gaming machine primarily dedicated to playing at least one casino wagering game and game-logic circuitry. The gaming machine includes an electronic display device configured to display an active array of symbol positions. The game-logic circuitry establishes a plurality of award levels including a first award level and a second award level such that each award level has a respective trigger condition associated with a number of trigger symbols and a corresponding array size, establishes a predefined path associated with the plurality of award levels, the predefined path initially defining a sequential order of progression through the plurality of award levels, wherein progression from the first award level is to the second award level based on the predefined path, causes the electronic display device to selectively populate the active array of symbol positions with one or more symbols through one or more game cycle outcomes, causes, in response to detecting a branching condition within the one or more game cycle outcomes, the electronic display device to update the predefined path to a modified path such that progression from the first award level is altered to a third award level of the plurality of award levels based on the modified path, causes, in response to progressing from the first award level to the third award level based on the modified path, the electronic display device to: (i) modify the active array to the array size corresponding to the third award level, and (ii) repeat the selective population for one or more additional game cycle outcomes with the modified active array, wherein none of the trigger symbols that appear in the active array are carried over to the modified active array, and causes the electronic display device to present an award sequence associated with an award of at least one award level of the plurality of award levels. The gaming system may be incorporated in its entirety into a gaming machine in some embodiments.

In an additional aspect of the present disclosure, a method of conducting and presenting a game using a gaming system is provided. The gaming system comprises game-logic circuitry and a gaming machine primarily dedicated to playing at least one casino wagering game and including an electronic display device configured to display an active array of symbol positions. The method is at least partially performed by the game-logic circuitry. The method comprises establishing a plurality of award levels including a first award level and a second award level such that each award level has a respective trigger condition associated with a number of trigger symbols and a corresponding array size, establishing a predefined path associated with the plurality of award levels that initially defines a sequential order of progression through the plurality of award levels, wherein progression from the first award level is to the second award level based on the predefined path, causing the electronic display device to selectively populate the active array of symbol positions with one or more symbols through one or more game cycle outcomes, causing, in response to detecting a branching condition within the one or more game cycle outcomes, the electronic display device to update the predefined path to a modified path, wherein progression from the first award level is altered to a third award level of the plurality of award levels based on the modified path, causing, in response to progressing from the first award level to the third award level based on the modified path, the electronic display device to: (i) modify the active array to the array size corresponding to the third award level, and (ii) repeat the selective population for one or more additional game cycle outcomes with the modified active array, wherein none of the trigger symbols that appear in the active array are carried over to the modified active array, and causing the electronic display device to present an award sequence associated with an award of at least one award level of the plurality of award levels.

In yet a further aspect of the present disclosure, a gaming machine primarily dedicated to playing at least one casino wagering game is provided. The gaming machine comprises an electronic display device configured to display an active array of symbol positions and game-logic circuitry. The game-logic circuitry establishes a plurality of award levels including a first award level and a second award level such that each award level has a respective trigger condition associated with a number of trigger symbols and a corresponding array size, establishes a predefined path associated with the plurality of award levels, the predefined path initially defining a sequential order of progression through the plurality of award levels, wherein progression from the first award level is to the second award level based on the predefined path, causes the electronic display device to selectively populate the active array of symbol positions with one or more symbols through one or more game cycle outcomes, causes, in response to detecting a branching condition within the one or more game cycle outcomes, the electronic display device to update the predefined path to a modified path, wherein progression from the first award level is altered to a third award level of the plurality of award levels based on the modified path, causes, in response to progressing from the first award level to the third award level based on the modified path, the electronic display device to: (i) modify the active array to the array size corresponding to the third award level, and (ii) repeat the selective population for one or more additional game cycle outcomes with the modified active array, wherein none of the trigger symbols that appear in the active array are carried over to the modified active array, and causes the electronic display device to present an award sequence associated with an award of at least one award level of the plurality of award levels.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 1I is a flow diagram of an example method for conducting and presenting a game feature including value-bearing symbols using a gaming system, according to one or more embodiments of the present disclosure.

Figure 1:
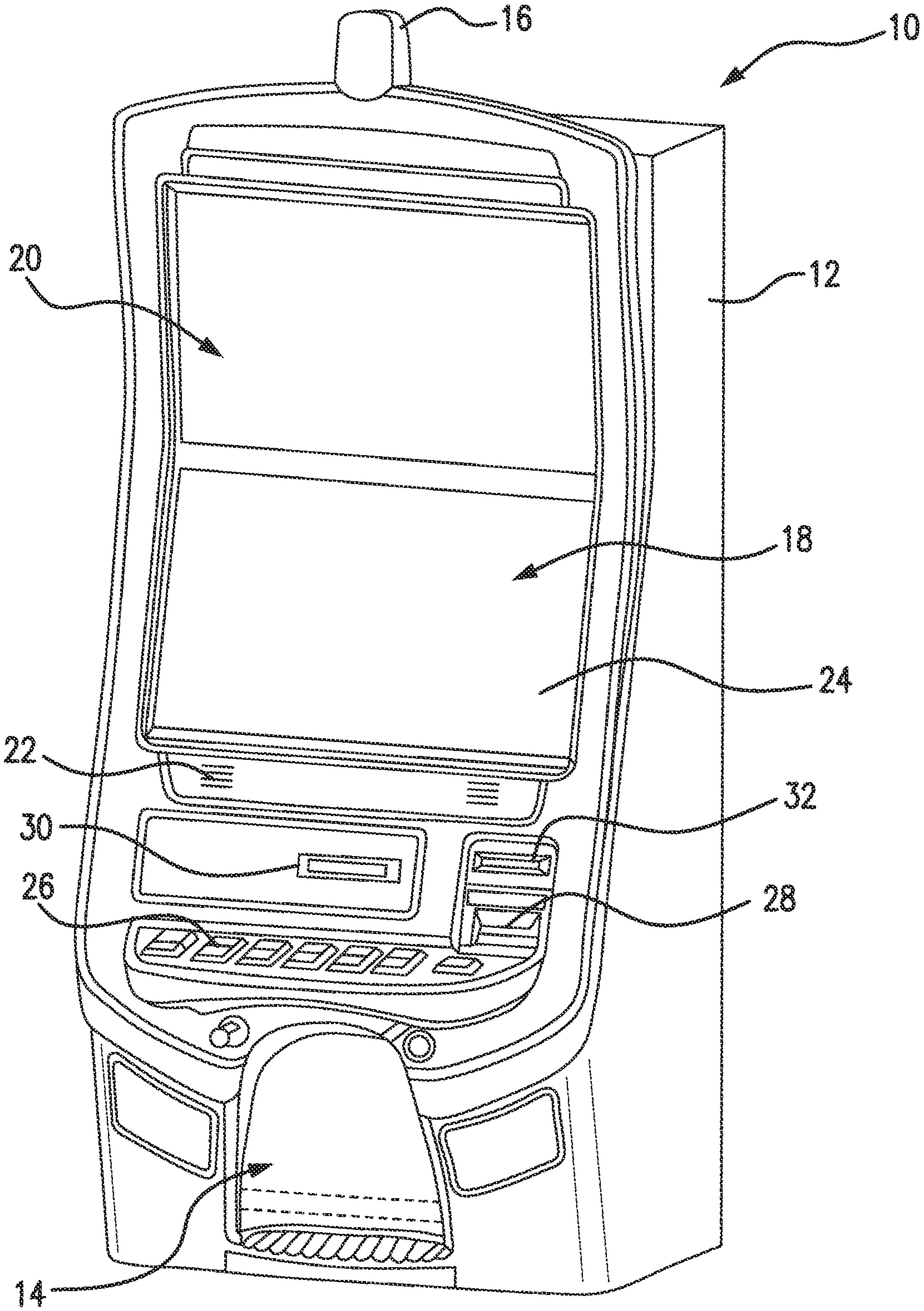
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

At least some embodiments of the present invention comprise an innovative application of data processing steps that, when implemented by game-logic circuitry, direct an electronic display device to present a game feature utilizing value-bearing symbols that minimizes processing overhead by utilizing numbered indicia to represent credit values instead of complex, fanciful game images. Further, the process aggregates displayed values borne by special symbols (i.e., value-bearing symbols) according to stored, variable criteria. In this way, the value-bearing symbols provide building blocks for innumerable different aggregation sequences simply by manipulating the aggregation criteria associated with the value-bearing symbols, resulting in fewer rules needed for the aggregation process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-aggregation process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
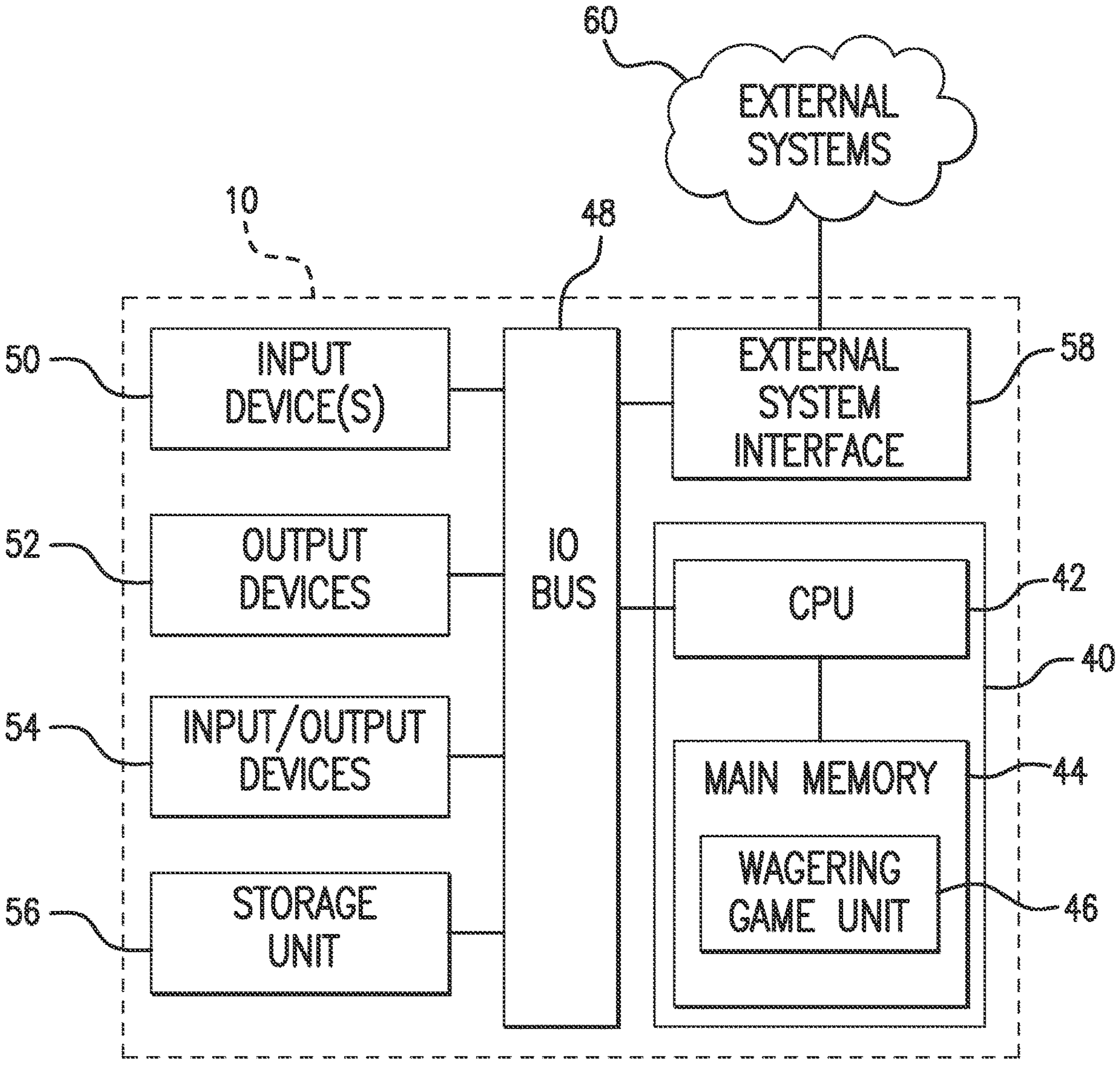
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The 1/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
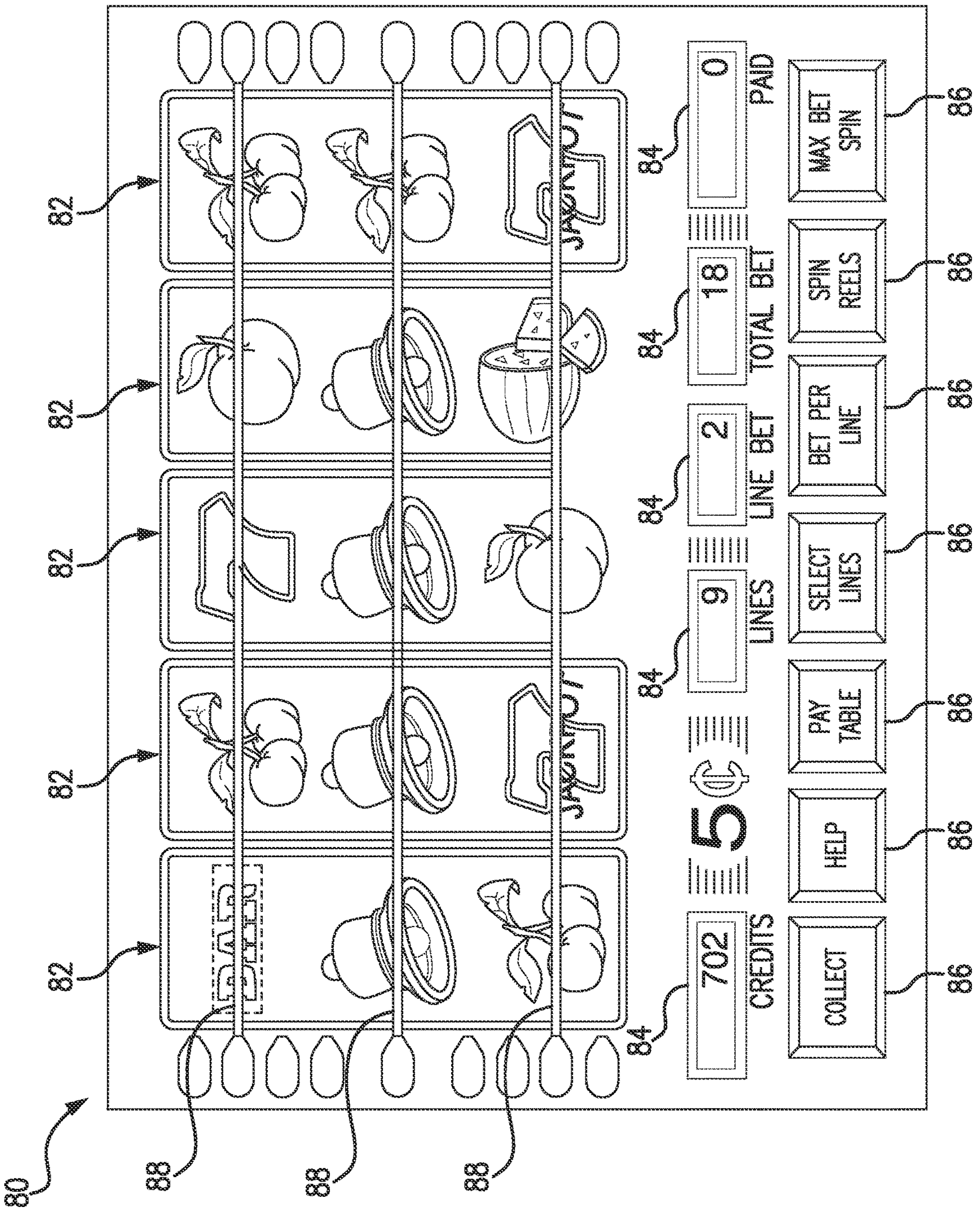
FIG. 3 is an image of an exemplary basic-game screen of a wagering game displayed on a gaming machine, according to an embodiment of the present invention.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager drawn on or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus games in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus games based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 4:
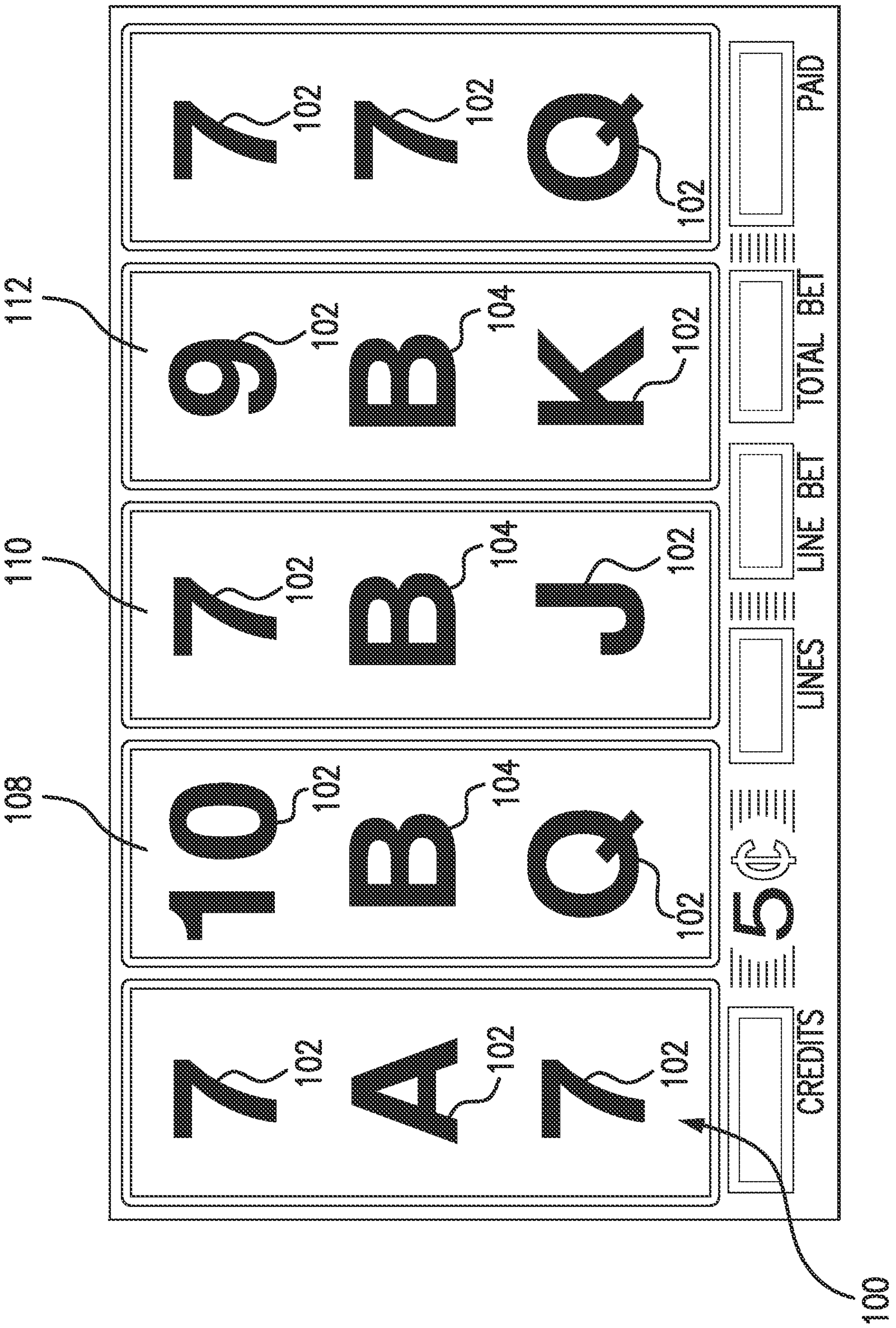
FIG. 4 is an image of an exemplary basic-game screen of a wagering game displayed on a gaming machine showing an outcome causing a bonus-trigger event, according to an embodiment of the present invention.

Referring now to FIG. 4, an image of a basic-game screen adapted to be displayed on the primary display 18 or the secondary display 20 is shown in one embodiment. The basic-game screen shows a symbol-bearing basic-game initial array 100 displaying a set of randomly determined symbols. The displayed symbols include a combination of non-bonus symbols 102 and bonus symbols 104. Alternatively or collectively, the displayed symbols are generated at positions of the initial array 100 by motion of mechanical reels or simulated motion of virtual reels consistent with the game format and theme. In the illustrated embodiment, a set of positions of the initial array 100 (e.g., each column) use the same symbol-bearing reel for displaying symbols. In other embodiments, each symbol of the initial array 100 is displayed using an independent symbol-bearing reel. In one embodiment, a bonus-trigger event occurs in response to the display of a threshold number of bonus symbols, such as three scattered bonus symbols 104 on middle reels 108, 110, and 112 in the initial array 100. That is, the displayed bonus symbols 104 in the initial array 100 is a bonus-trigger event that initiates a bonus game.

In an embodiment described in more detail below, the bonus game awards three free games commencing at bonus level one. During the bonus game, special upgrade symbols borne by bonus reels may land in the bonus array. Collect the required number of upgrade symbols over one or more spins to advance to the next bonus level, expand the bonus array by one additional row, and reset the remaining free spins to three. The number of upgrade symbols collected resets to zero after advancing a bonus level. Additional upgrade symbols collected over the required amount during the current free spin do not carry over to, i.e., count towards, the next bonus level. And none of the upgrade symbols that appear in the bonus array are held or locked in place from one free game to the next. The bonus game ends when no free games remain or bonus level nine is reached. Each bonus level is associated with a respective one of eight progressive jackpots that are funded and incremented by a percentage of wagers placed on the wagering game. When the bonus game ends, the progressive jackpot at the current bonus level is awarded. Only one progressive jackpot is awarded per bonus game. An alternate set of bonus reels is used during each bonus level of the bonus game. Winning symbol combinations for these bonus reels may be identical to the basic game except the bonus symbols may not appear on the bonus reels.

Figure 5A:
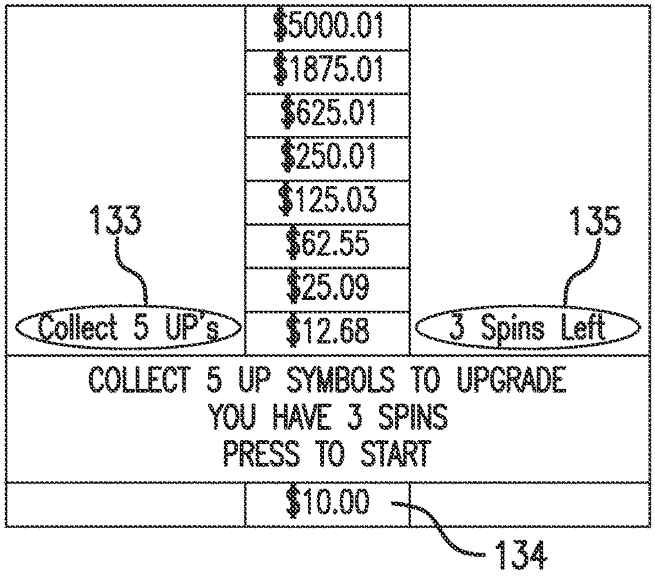
FIGS. 5A-5C, 6A-6D, and 7A-7B are images of an exemplary bonus-game screen of a wagering game displayed on a gaming machine, according to an embodiment of the present invention.
Figure 5B:
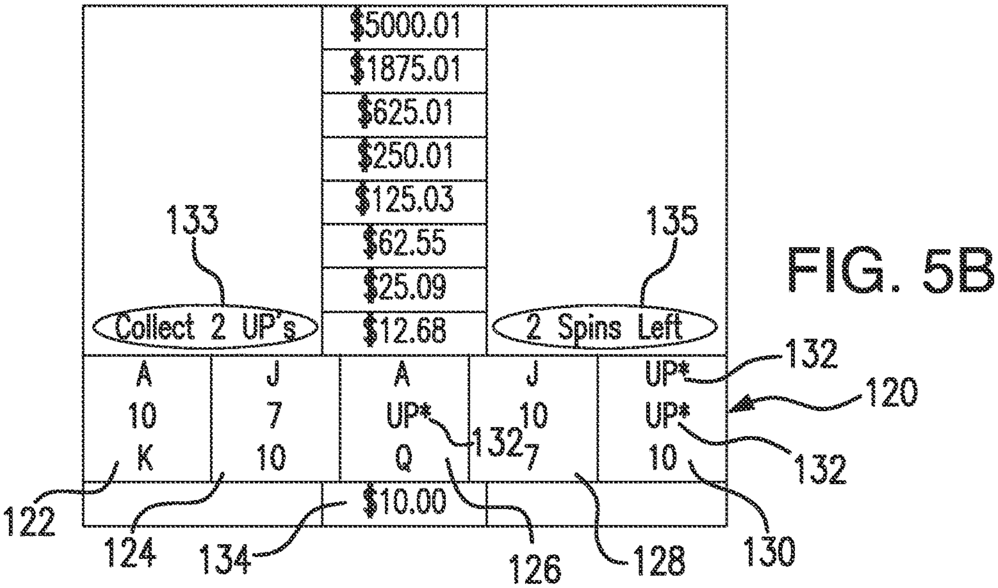
Figure 5C:
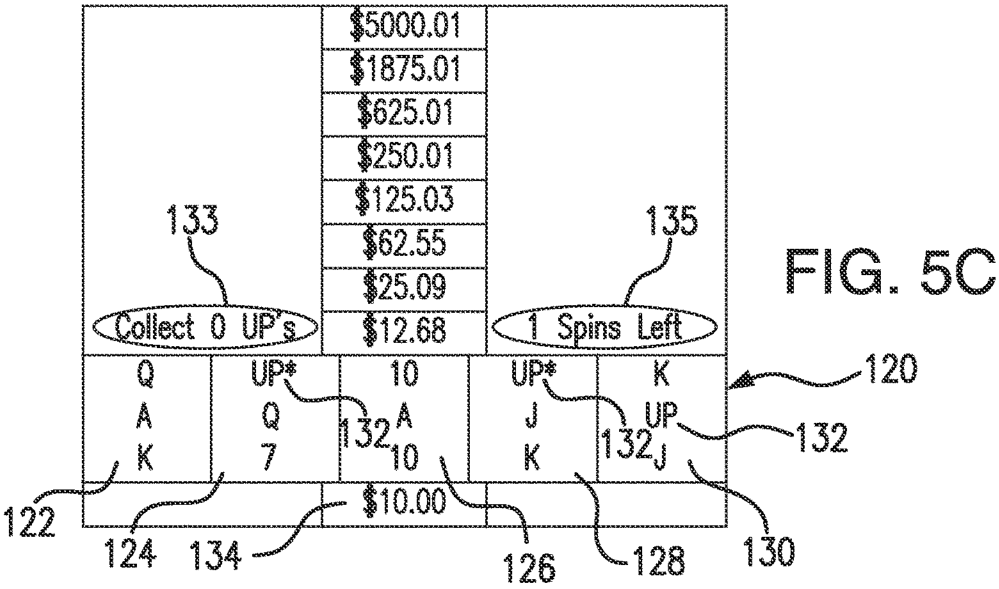

FIGS. 5A-5C, 6A-6D, and 7A-7B illustrate an example of bonus game play under control of the game-logic circuitry. Referring first to FIGS. 5A-5C, there is shown an image of a bonus-game screen adapted to be displayed on the primary display 18 or the secondary display 20. The screen comprises a symbol-bearing active bonus array 120. The symbol positions of the bonus array 120 are arranged in rows and columns, and the columns are associated with respective symbol-bearing bonus reels 122, 124, 126, 128, and 130. Alternatively, each symbol position of the bonus array 120 is associated with a respective symbol-bearing bonus reel. The bonus reels carry a number of different symbols arranged in a particular way and may vary considerably from the number, type, and arrangement of symbols on the basic-game reels. Among the different symbols on the bonus reels are special upgrade symbols 132 illustrated in the figures as "UP" symbols. In each free game of the bonus game, the bonus reels are spun and stopped to randomly place symbols on the stopped reels in visual association with the bonus array 120. Specifically, the stopped bonus reels 122, 124, 126, 128, and 130 depict symbols that populate the respective first, second, third, fourth, and fifth columns of the bonus array 120. In accordance with a pay table, awards are provided for any winning combinations of symbols resulting from each free game.

The bonus game initially awards up to three free games at bonus level one. Bonus level one is associated with a first progressive jackpot 134. The bonus array 120 at bonus level one has three rows and five columns. During the free games at bonus level one, upgrade symbols 132 from the bonus reels may land in the bonus array 120. In response to five upgrade symbols appearing in the bonus array 120 over the course of up to three free games, the bonus game upgrades to bonus level two, expands the bonus array 120 by one additional row to four rows, and resets the remaining free games to three. Additional upgrade symbols collected over the required upgrade amount during the current free game do not carry over to the next bonus level.

FIG. 5A shows an image at bonus level one prior to a first free game, with an upgrade symbol counter 133 initialized at five and a spin counter 135 initialized at three. FIG. 5B shows an image at bonus level one at the conclusion of a first free game, i.e., after the bonus reels have spun and stopped to place symbols, including three upgrade symbols 132, from the stopped bonus reels in the bonus array 120. The upgrade symbol counter 133 has been decremented to two. The upgrade symbols 132 may be successively marked, for example, with an asterisk as the counter 133 is decremented. The spin counter 135 has been decremented to two. FIG. 5C shows an image at bonus level one at the conclusion of a second free game with three upgrade symbols 132 appearing in the bonus array 120. The upgrade symbol counter 133 has been decremented to zero. The spin counter 135 has been decremented to one. The collection of six upgrade symbols 132, i.e., three from the first free game and three from the second free game, exceeds the requisite number of five upgrade symbols, thereby causing the bonus game to upgrade to bonus level two, expand the bonus array 120 to four rows, and reset the remaining free games on the spin counter 135 to three. The additional/sixth upgrade symbol does not carry over to bonus level two.

Referring to FIGS. 6A-6D, the bonus game awards up to three free games at bonus level two. Bonus level two is associated with a second progressive jackpot 136. The bonus array 120 at bonus level two has four rows and five columns. During the free games at bonus level two, upgrade symbols 132 from the bonus reels may land in the bonus array 120. In response to ten upgrade symbols appearing in the bonus array 120 over the course of up to three free games, the bonus game upgrades to bonus level three, expands the bonus array 120 by one additional row to five rows, and resets the remaining free games to three. Additional upgrade symbols collected over the required upgrade amount during the current free game do not carry over to the next bonus level.

Figure 6A:
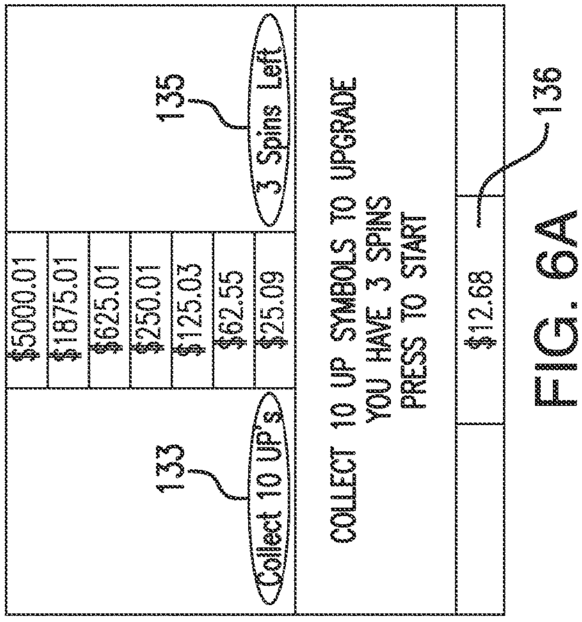
Figure 6B:
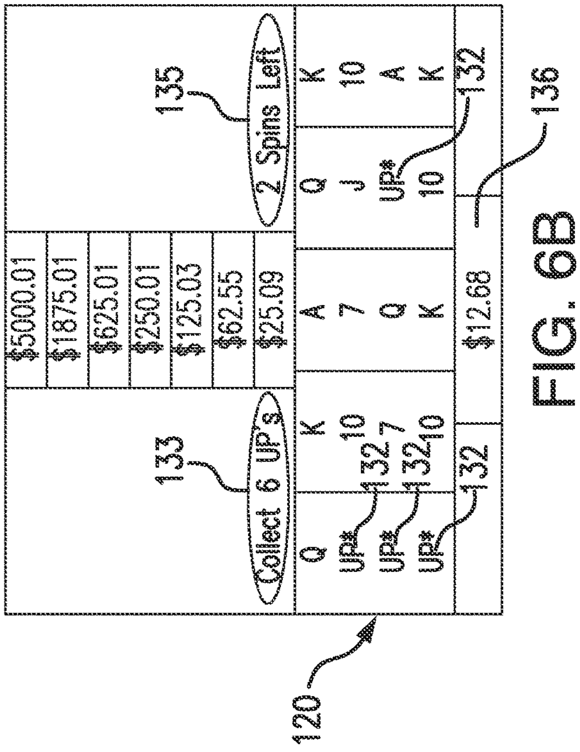
Figure 6C:
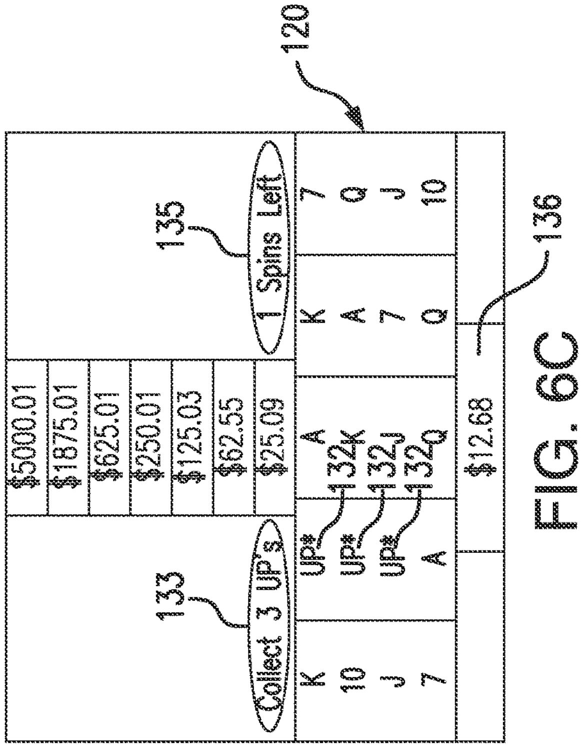
Figure 6D:
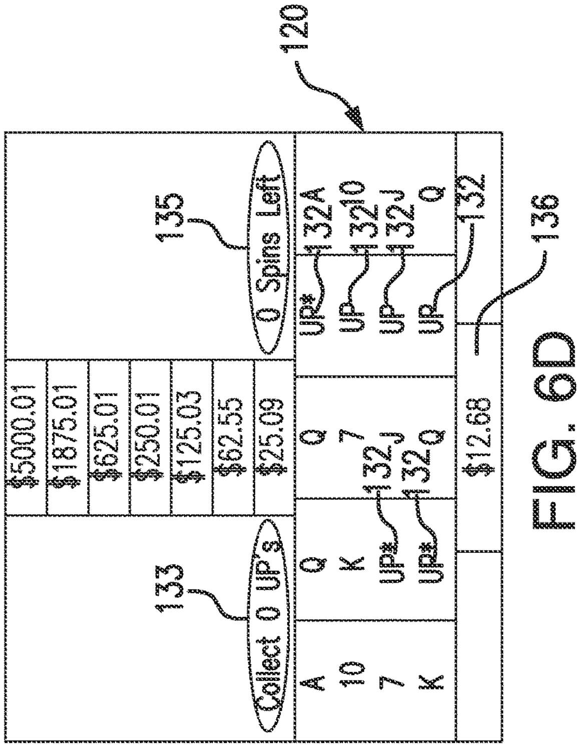

FIG. 6A shows an image at bonus level two prior to a first free game. FIG. 6B shows an image at bonus level two at the conclusion of a first free game with four upgrade symbols 132 appearing in the bonus array. The upgrade symbol counter 133 has been decremented to six. The spin counter 135 has been decremented to two. FIG. 6C shows an image at bonus level two at the conclusion of a second free game with three upgrade symbols 132 appearing in the bonus array 120. The upgrade symbol counter 133 has been decremented to three. The spin counter 135 has been decremented to one. FIG. 6D shows an image at bonus level two at the conclusion of a third free game with six upgrade symbols 132 appearing in the bonus array 120. The upgrade symbol counter 133 has been decremented to zero. The spin counter 135 has been decremented to zero. The collection of thirteen upgrade symbols 132, i.e., three from the first free game, four from the second free game, and six from the third free game, exceeds the requisite number of ten upgrade symbols, thereby causing the bonus game to upgrade to bonus level three, expand the bonus array 120 to five rows, and reset the remaining free games on the spin counter 135 to three. The additional three upgrade symbols beyond the requisite number often upgrade symbols do not carry over to bonus level three.

Figure 7A:
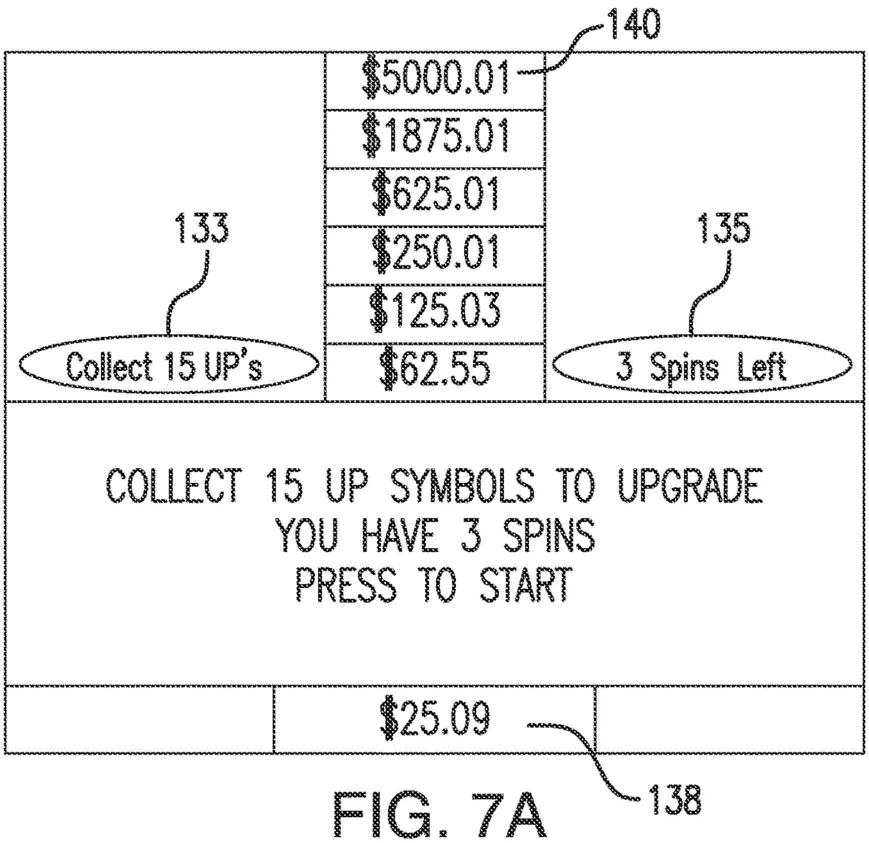
Figure 7B:
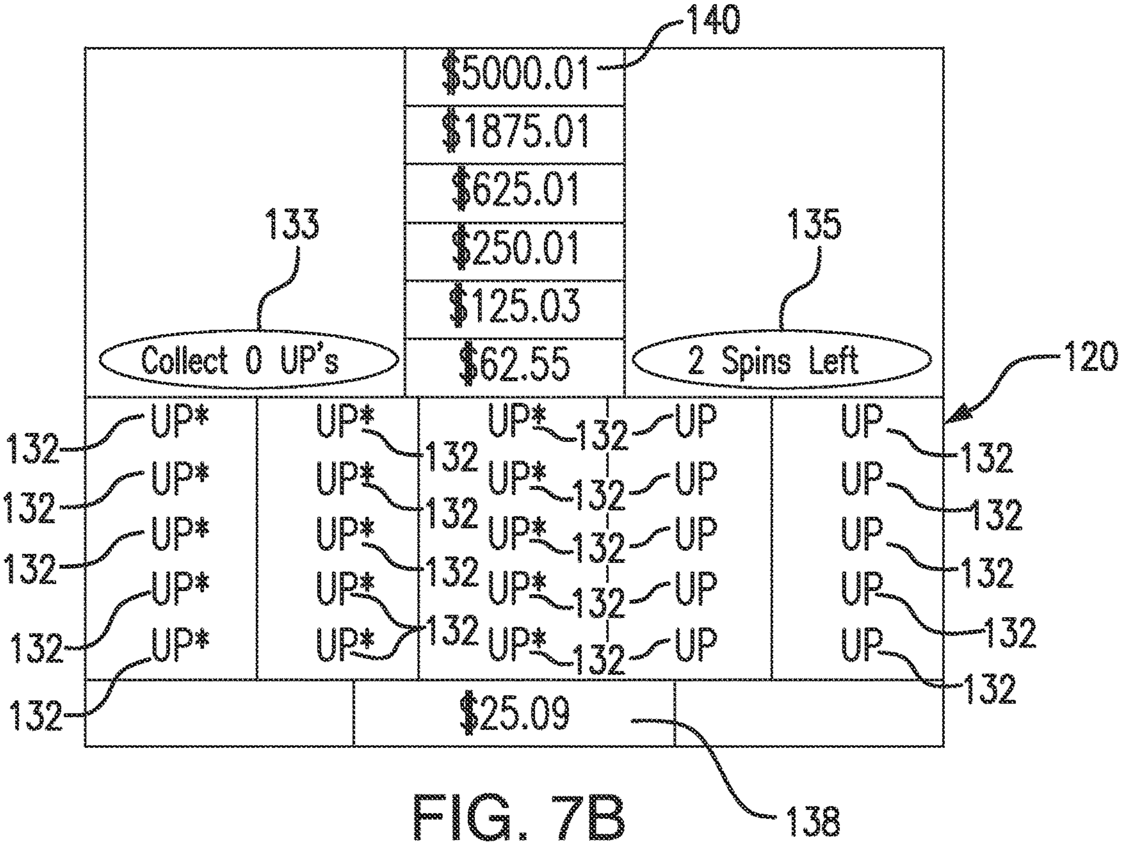

Referring to FIGS. 7A-7B, the bonus game awards up to three free games at bonus level three. Bonus level three is associated with a third progressive jackpot 138. The bonus array 120 at bonus level three has five rows and five columns. During the free games at bonus level three, upgrade symbols 132 from the bonus reels may land in the bonus array 120. In response to fifteen upgrade symbols appearing in the bonus array 120 over the course of up to three free games, the bonus game upgrades to bonus level four, expands the bonus array 120 by one additional row to six rows, and resets the remaining free games to three. Additional upgrade symbols collected over the required upgrade amount during the current free game do not carry over to the next bonus level.

FIG. 7A shows an image at bonus level three prior to a first free game. FIG. 7B shows an image at bonus level three at the conclusion of a first free game with twenty-five upgrade symbols 132 filling the entire bonus array. The upgrade symbol counter 133 has been decremented to zero. The spin counter 135 has been decremented to two. The collection of twenty-five upgrade symbols 132 from the first free game exceeds the requisite number of fifteen upgrade symbols, thereby causing the bonus game to upgrade to bonus level four, expand the bonus array 120 to six rows, and reset the remaining free games on the spin counter 135 to three. The additional ten upgrade symbols beyond the requisite number of fifteen upgrade symbols do not carry over to bonus level four.

The bonus game continues in the above manner until it either reaches the top bonus level, i.e., bonus level nine, or does not generate the requisite number of upgrade symbols at the current bonus level before reaching the top level. If the bonus game reaches the top bonus level, the bonus game ends without any further free games and awards the ninth progressive jackpot 140. If, however, the bonus game does not generate the requisite number of upgrade symbols at the current level before reaching the top level, the bonus game ends at the current level and awards the progressive jackpot associated with the current level. In a preferred embodiment, the bonus game awards only the progressive jackpot associated with the highest bonus level achieved. In an alternative embodiment, the bonus game also awards the progressive jackpots associated with any bonus levels below the highest bonus level achieved.

The bonus game uses new and improved gaming apparatus animations that represent improvements to the underlying technology or technical field of gaming apparatus in the context of the disclosed embodiments of the present invention. For example, the bonus game triggers expansion of the symbol array in response to a predetermined number of upgrade symbols appearing in the symbol array over the course of a number of free games, without carrying over upgrade symbols as the bonus array is expanded or from one free game to the next.

Furthermore, to designate upgrade symbols appearing in the bonus array with animation, each upgrade symbol that lands in the bonus array and counts towards the requisite number may be highlighted, marked (e.g., with an asterisk, star, or check mark), enlarged, brightened, bordered, or distinguished through other animations from its standard appearance. The upgrade symbols are successively designated in the order of the first column from top to bottom, the second column from top to bottom, the third column from top to bottom, the fourth column from top to bottom, and then the fifth column from top to bottom. As each upgrade symbol is designated, the upgrade symbol counter 133 is decremented simultaneously, e.g., in tandem, to clearly indicate progress towards achieving the requisite number of upgrade symbols at the current bonus level. Once the upgrade symbol counter reaches zero, no further upgrade symbols in the bonus array need to be designated.

Moreover, to clearly designate the progressive jackpot at the current bonus level, the progressive jackpot at the current bonus level may be shown below the bonus array while the progressive jackpots at all bonus levels above the current level are shown above the bonus array. To illustrate an upgrade from a current bonus level to the next bonus level, the progressive jackpot at the current bonus level may "drop off" the lower end of the bonus-game screen, and the progressive jackpot at the next bonus level may shift downward from above the bonus array to below the bonus array, replacing the progressive jackpot that dropped off the screen. The bonus array may then expand or grow vertically by one additional row to fill the space that was occupied by the down-shifted progressive jackpot.

The table below provides an example of the number of bonus levels; the size of the bonus array 120 in terms of number of rows M by number columns N at each bonus level; the requisite number of upgrade symbols 132 that must be collected at each bonus level to advance to the next level; the allotted number of free games at each level to collect the requisite number of upgrade symbols 132; and the minimum value, i.e., reset value, of the progressive jackpot at each level prior to any incrementation.

| Bonus Level | M × N Bonus Array | Requisite Number of Upgrade Symbols to Advance to Next Level | Maximum Number of Free Games to Collect Upgrade Symbols | Minimum Progressive Jackpot Value |
|---|---|---|---|---|
| 1 | 3 × 5 | 5 | 3 | $10.00 |
| 2 | 4 × 5 | 10 | 3 | $12.50 |
| 3 | 5 × 5 | 15 | 3 | $25.00 |
| 4 | 6 × 5 | 20 | 3 | $62.50 |
| 5 | 7 × 5 | 30 | 3 | $125.00 |
| 6 | 8 × 5 | 40 | 3 | $250.00 |
| 7 | 9 × 5 | 55 | 3 | $625.00 |
| 8 | 10 × 5 | 70 | 3 | $1875.00 |
| 9 | NA | NA | NA | $5000.00 |

In alternative embodiments, the number of available bonus levels may vary to be greater than nine bonus levels or as few as two bonus levels.

The displayed bonus array 120 at a given bonus level may be larger than an active portion used at that bonus level to display an outcome of a free game, i.e., winning combinations and collected upgrade symbols. For example, although the active bonus array at bonus level one may be a 3×5 array, the seven rows applicable to respective bonus levels two through eight, as well as symbols that populate those rows in a free game outcome, may be dimly shown on the bonus-game screen above the 3×5 array even though those rows and associated symbols are not part of the free game outcome.

Instead of expanding the bonus array 120 vertically to include an additional row or rows with each upgrade, the bonus array 120 may expand vertically to include an additional column or columns with each upgrade, an additional row(s) and/or column(s) with each upgrade, or an additional partial row(s) and/or column(s) with each upgrade. The type of expansion may be randomly selected.

The requisite number of upgrade symbols 132 to advance from the current bonus level to the next bonus level may vary from those shown in the table. Although the requisite number is determined either before commencing the bonus game or before commencing the current bonus level, the requisite number may be randomly determined.

The allotted number of free games at each bonus level may be more or less than three and may vary from one bonus level to the next. And if the requisite number of upgrade symbols 132 to advance from the current bonus level to the next bonus level is achieved in less than the allotted number of free games in the current bonus level, any leftover/unused free games may be carried over to the next bonus level. For example, if a requisite number of five upgrade symbols is achieved in one free game but the allotted number of free games at the current bonus level is three, the two leftover free games may be carried over and added to the allotted number of free games at the next bonus level.

Instead of associating a progressive jackpot value with each bonus level, each bonus level may be associated with a fixed jackpot value that does not increment as wagers are placed on the wagering game. Alternatively or in addition, each upgrade symbol 132 that lands in the bonus array 120 may bear or be associated with a respective credit value. The credit values associated with the upgrade symbols 132 may generally increase in value from one bonus level to the next. The bonus game may award the credit values associated with all collected upgrade symbols 132 at the highest bonus level achieved. In an alternative embodiment, the bonus game also awards the credit values associated with all collected upgrade symbols 132 at any bonus levels below the highest level achieved. Thus, the bonus game provides an award based on the upgrade symbols 132, whether the award be a progressive or fixed jackpot value associated with the bonus level achieved by collecting upgrade symbols 132 or the award be credit values directly associated with the collected upgrade symbols 132.

Figure 8A:
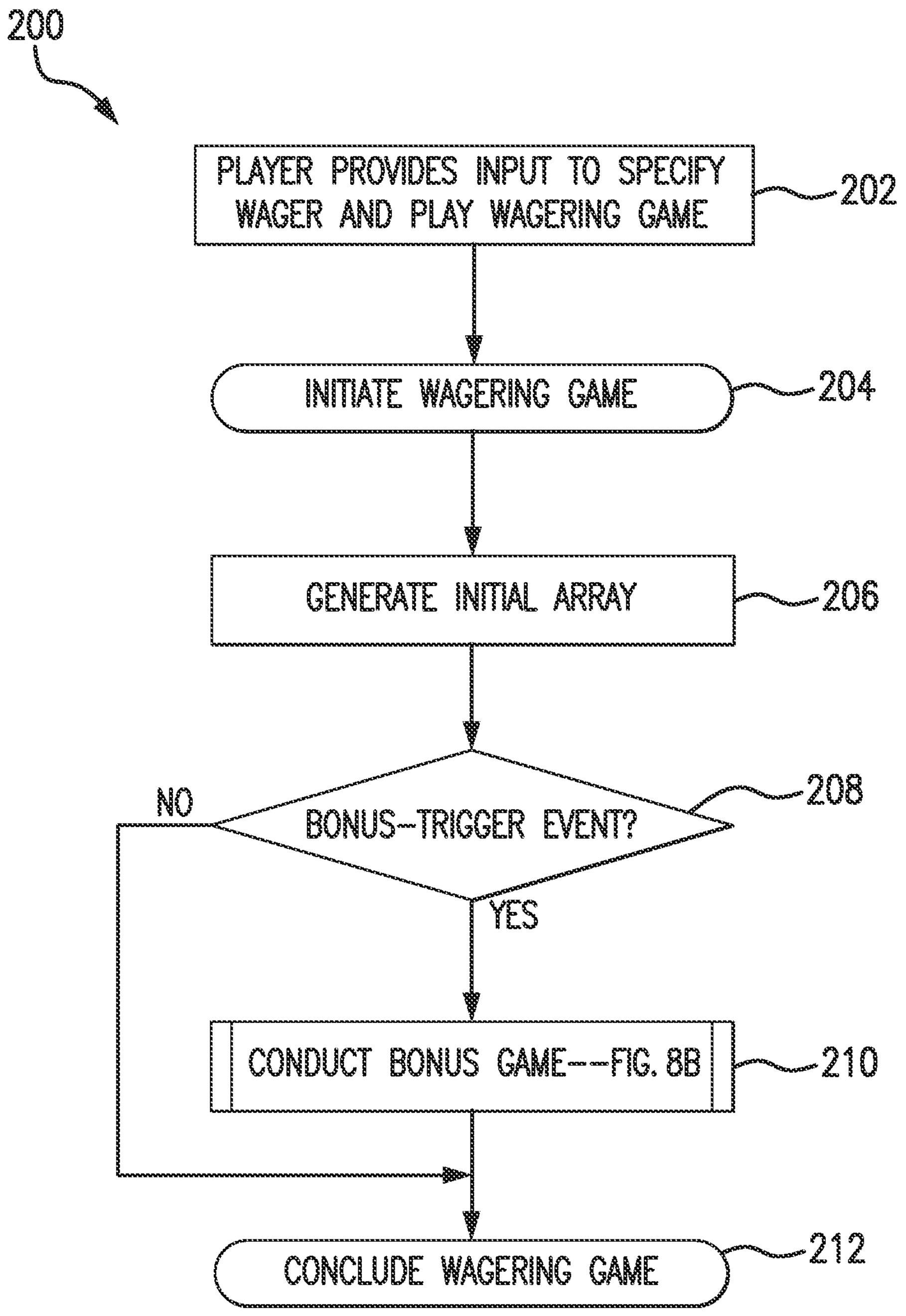
FIGS. 8A-8B are flowcharts for an algorithm that corresponds to instructions executed by a controller in accord with at least some aspects of the disclosed concepts.

Referring now to FIG. 8A, a flowchart, described by way of example above, represents one data processing method 200 corresponding to at least some instructions stored and executed by the game-logic circuitry 40 in FIG. 2 to perform the above described functions associated with the disclosed concepts. The method 200 further incorporates a data processing method 300 detailed in FIG. 8B that describes one way a bonus game may be conducted during the operation of the wagering game in response to a bonus-trigger event.

In step 202, the game-logic circuitry 40 receives player input via one or more input devices that indicates a wager amount drawn from a credit balance and an intention to initiate an instance of the wagering game. Examples of input include pressing a "MAX BET" or "SPIN REELS" button on a wagering machine, or interfacing with the wagering game system in another way, e.g., using a mobile device or hand gesture to control the wagering machine.

In step 204, in response to the input provided by the player and interpreted by the wagering game machine and system, the wagering game is initiated as the formal process for conducting the wagering game is started. In one embodiment, credits are deducted from a credit meter to fund the gaming instance in accordance with the player input indicating a wager drawn from a credit balance associated with the player.

In step 206, the basic-game initial array is initialized and symbols are randomly determined using a set of basic-game reels to generate a corresponding basic-game initial array outcome. That is, one or more electronic display devices are directed to display symbols representing at least a part of an outcome of the wagering game in the initial array. As discussed prior, the initial array may comprise any type of configuration, reels composition, and associated criteria for bonus-trigger events, feature-trigger events, and award-trigger events. The specifics of the basic-game and initial array may be greatly varied between embodiments.

In step 208, there is a determination as to whether a bonus-trigger event is included in the initial array outcome. In one embodiment, a set of bonus symbols displayed in the initial array is a bonus-trigger event initiating a bonus game. In other embodiments, the bonus-trigger event is a mystery trigger.

In step 210, in response to a bonus-trigger event, a bonus game is performed. In one embodiment, the bonus game is initiated on a bonus array of symbol-bearing bonus reels that include special upgrade symbols. One specific embodiment for conducting a bonus game is described in detail in FIG. 8B below. During the bonus game, an award-trigger event may occur resulting in a corresponding amount awarded to the player. Award-trigger events may result in awarding a credit value in one or more currencies, free wagering game instances, progressive jackpot awards, non-credit related prizes, etc.

In step 212, after the bonus game is completed (or in the event that no bonus-trigger event was present in the initial array), the wagering game instance is formally concluded.

Figure 8B:
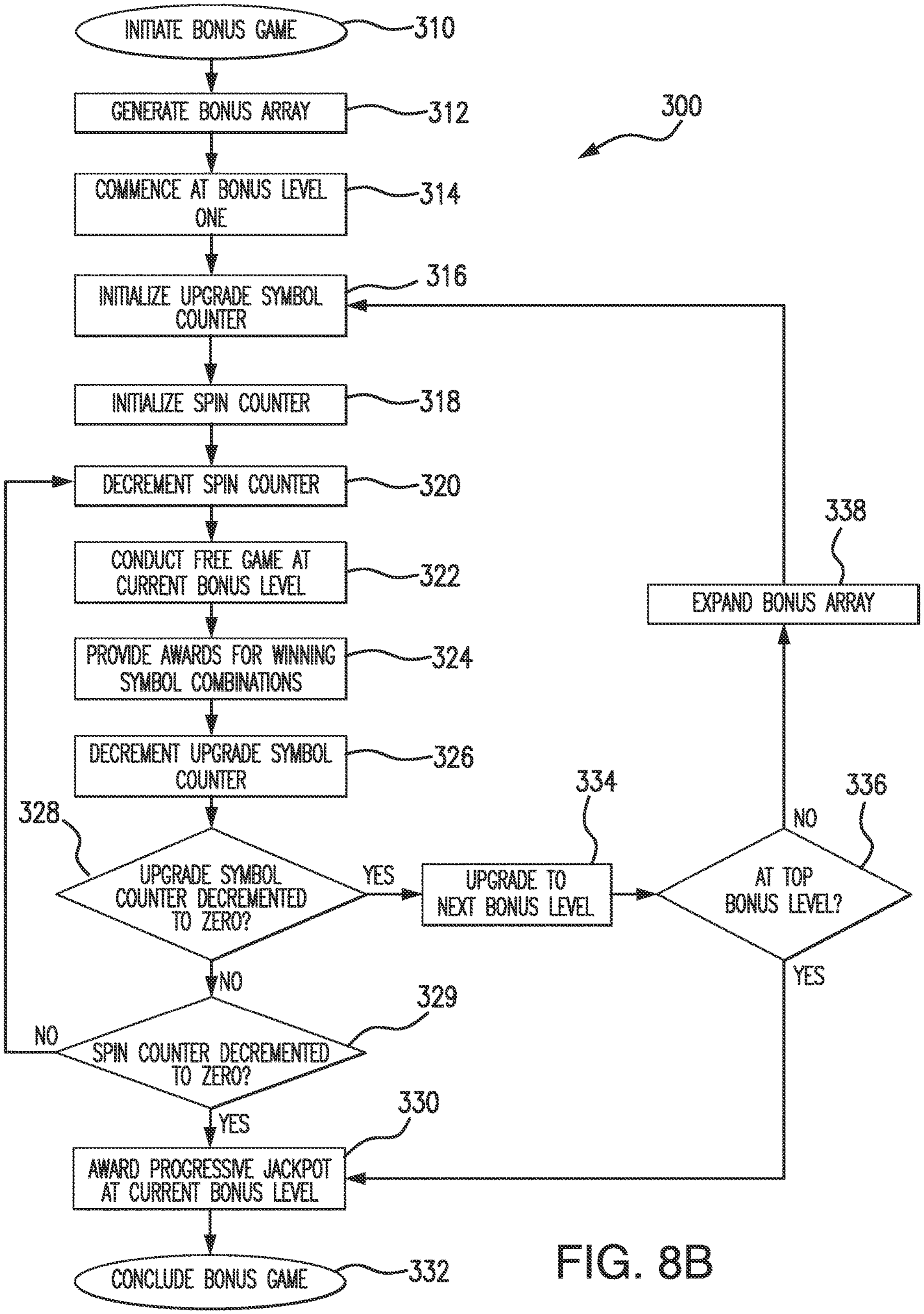

Referring now to FIG. 8B, one embodiment for a data processing method 300 is represented corresponding to at least some instructions stored and executed by the game-logic circuitry 40 in FIG. 2 to perform the above described functions. The data processing method 300 describes performing a bonus game conducted during the operation of the wagering game described in FIG. 8A in one embodiment.

In step 310, the bonus game is initiated in response to a bonus-trigger event in the initial array, in one embodiment. As detailed prior, the bonus game may be initiated by a bonus-trigger event that includes one or more bonus symbols displayed as part of a basic-game initial array outcome or as a result of a mystery trigger (e.g., RNG selection).

In step 312, the bonus game generates a bonus array comprising a set of array positions where a set of symbol-bearing bonus reels are used in conjunction with one or more random numbers to conduct a plurality of free games and visually display symbols in the array positions.

In step 314, the bonus game commences at bonus level one.

In step 316, the bonus game initializes an upgrade symbol counter to an initial value, such as five, associated with the current bonus level. The upgrade symbol counter (e.g., upgrade symbol counter 133) is displayed on the graphical user interface.

In step 318, the bonus game initializes a spin counter to an initial value such as three. The spin counter (e.g., spin counter 135) is displayed on the graphical user interface.

In step 320, the bonus game decrements the spin counter (e.g., spin counter 135) by one prior to initiating and conducting a free game.

In step 322, the bonus game conducts a free game at the current bonus level by spinning and stopping the bonus reels to randomly populate the bonus array with symbols. The symbols may include standard symbols (including "blank" symbols) and special upgrade symbols.

In step 324, in accordance with a pay table, the bonus game provides awards for any winning combinations of symbols resulting from the free game. The awards may, for example, include line pays and scatter pays.

In step 326, the bonus game decrements the upgrade symbol counter (e.g., upgrade symbol counter 133) by one for each upgrade symbol appearing in the bonus array.

In step 328, the bonus game determines whether or not the upgrade symbol counter decremented to zero in prior step 326.

If the upgrade symbol counter did not decrement to zero, in step 329 the bonus game determines whether or not the spin counter decremented to zero in prior step 320. If the spin counter decremented to zero, the bonus game awards the progressive jackpot at the current bonus level in step 330 and concludes in step 332. If the spin counter did not decrement to zero, the process flow of the bonus game returns to step 320.

If the upgrade symbol counter decremented to zero, the bonus game upgrades to the next bonus level in step 334 and determines whether or not that next bonus level is the top bonus level (e.g., bonus level nine) in step 336. If that next bonus level is the top bonus level, the bonus game awards the progressive jackpot at that top bonus level in step 330 and concludes in step 332. If that next bonus level is not the top bonus level, the bonus game expands the bonus array by one additional row in step 338 and returns its process flow to step 316.

When the bonus game concludes, the process flow returns to the parent wagering game process that called the bonus game so that the wagering game can continue or formally conclude.

In at least some embodiments, the systems and methods described herein are configured to provide game features with dynamic progression through the collection of symbols. In certain embodiments, the dynamic progression may be provided by changing or otherwise altering the awards provided at each bonus level. For example, the game feature may include collecting value-bearing symbols that visibly identify a respective award value. Collecting a value-bearing symbol (as upgrade symbols or in combination with other upgrade symbols) also causes the award value of the value-bearing symbol to be applied to a progressive jackpot or other award of one or more bonus levels such that the awards for progressing through the bonus levels is dynamic. In other embodiments, the dynamic progression may be provided through dynamic changes to the path of progression through the bonus levels. That is, one or more game events or conditions may cause the game feature to skip certain bonus levels, combine bonus levels, and/or otherwise alter the path through the bonus levels.

In the embodiments disclosed herein, each value-bearing symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing symbol as part of the reel strip layouts of the game reels. In still other embodiments, the assigned value may be randomly selected before, during, or at the conclusion of a reel spin.

Figure 9:
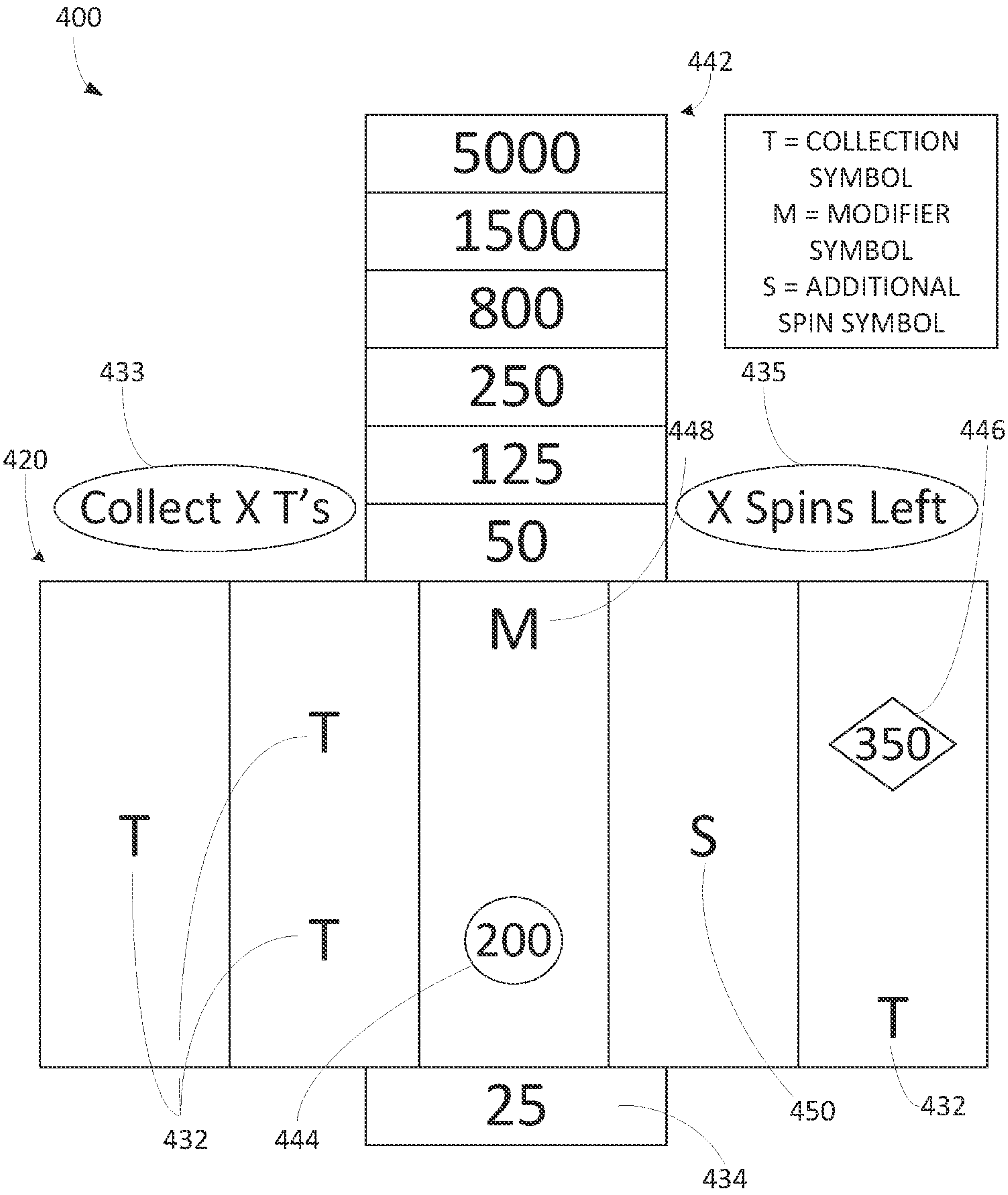
FIG. 9 is an example game interface for a game feature including trigger symbol collection, according to one or more embodiments of the present disclosure.

FIG. 9 depicts an example game interface 400 presented by a gaming system, such as the system shown in FIGS. 1 and 2, incorporating dynamic progression through the collection of symbols. The interface 400 is presented by one or more display devices of the gaming system. It is to be understood that although one display device is referenced herein with respect to FIG. 9, embodiments presenting the elements described herein across multiple display devices are considered within the scope and spirit of the present invention.

In the example embodiment, the game interface 400 is similar to the interfaces shown in FIGS. 5A-7B. More specifically, the game interface 400 includes an active array 420, trigger symbols 432, a symbol counter 433, a first jackpot award 434, a spin counter 435 (also sometimes referred to as a "game cycle counter"), and a set of jackpot awards 442. In other embodiments, the game interface 400 may include additional, fewer, or alternative presentation elements, including those described elsewhere herein.

Similar to the game features described above, the game feature associated with the game interface 400 includes collecting certain symbols within a limited number of spins or game cycles to expand the active array 420 and progress through different award or bonus levels. In variants of the embodiments describes herein the active array 420 may not expand. In such embodiments, the additional active arrays may be presented in place of array expansion, or the active array 420 may remain fixed the play of the game feature. Rather than "UP" symbols (or upgrade symbols), the game feature associated with the game interface 400 includes the collection of "T" symbols (also referred to more generally as "trigger symbols 432"). Each award level is associated with a respective trigger condition and a respective award. In the example embodiment, the trigger condition is collecting a certain number of trigger symbols 432 within a given number of game cycle outcomes (i.e., spins), and the award is a jackpot award. The jackpot award may be a progressive jackpot value or is set at an initial, predefined jackpot value. In other embodiments, other trigger conditions and/or other awards may be included in addition to or in place of the trigger conditions and jackpot awards of the example embodiment. In one example, at least some award levels may not have any jackpot award, but rather provide symbols, spins, modifiers, and the like within the game feature described herein or a base game feature (e.g., the game feature shown in FIG. 3). In another example, an additional or alternative trigger condition may be provided for the award levels, where increasing the respective jackpot value to meet or exceed a threshold value automatically progresses the player to the next award level. If such a trigger condition is used in place of collecting a predefined number of trigger symbols, the counters relating to symbol collection in the various embodiments described herein may be replaced with one or more counters monitors the jackpot values for the trigger conditions.

The different levels are indicated by the jackpot awards 442 presented within the game interface 400 similar to the interfaces shown in FIGS. 5A-7B. In at least some embodiments, the player is associated with one of the award levels at the time such that the player is provided the award of the associated award level at the conclusion of the game feature. In other embodiments, the player may be provided awards for all or a plurality of award levels achieved by the player at the conclusion of the game feature. Progression through the award levels is defined by an initial, predefined path, where completing or achieving the trigger condition of one award level will cause the player to progress the next award level defined by the path. In one example, the predefined path causes the player to progress through award levels with increasing jackpot award values. As described further herein, some embodiments may alter or adjust this predefined path.

In some embodiments, the active array 420 may be populated with additional or alternative symbols. For example, the active array 420 as shown includes a value-bearing symbol 444, a modified value-bearing symbol 446, a modifier symbol 448, and an additional spin symbol 450. Other symbols, such as symbols that modify the required number of trigger symbols 432 to progress to the next award level, may also be included within the set of available symbols to populate the active array 420.

Although the example embodiment shown in FIG. 9 includes "T" trigger symbols 432, it is to be understood that the trigger symbols 432 of the game feature described herein are not limited to dedicated collection symbols, but rather may include other functionality. In some embodiments, the value-bearing symbols 444 function as the trigger symbols 432. In other embodiments, the modified value-bearing symbols 446 function as the trigger symbols. In certain embodiments, a variety of trigger symbols 432 are provided. For example, in FIG. 9, the dedicated trigger symbols 432 (i.e., non-value-bearing symbols), the value-bearing symbols 444, and the modified value-bearing symbols 446 may all be collected together or independently to function as triggers for advancing an award level as described herein.

The value-bearing symbol 444 is a symbol that includes award indicia that visibly indicates an award value associated with the value-bearing symbol 444. In the illustrated example, the value-bearing symbol 444 has an award value of "200" as indicated by the text on the symbol 444. In other embodiments, the award indicia may not be text, but rather other suitable visual characteristics that convey the award value to the player. The award value of the value-bearing symbol 444 may be provided as an award to the player in response to the value-bearing symbol 444 occupying the array 420, in response to a certain symbol combination on the array, and/or other suitable award conditions. In the example embodiment, the award value of the value-bearing symbol 444 is applied to one or more jackpot awards 442 (which may include the current award 434). In the illustrated example, the scale of the award values from the value-bearing symbols 444 and the jackpot awards 442 are different such that award values from the value-bearing symbols 444 are converted to match the scale of the jackpot awards 442 before being applied. In certain embodiments, particularly embodiments in which certain award levels include non-jackpot awards in addition to or in place of the jackpot awards 442 (e.g., free spins, symbols for the base game feature, etc.), the award value of the value-bearing symbol 444 may be converted into a comparable award to be applied to a given non-jackpot award through one or more conversion tables stored by the gaming system. For example, if a certain number of modifier or wild symbols are awarded for play of the base game feature, the award value may be converted into a suitable number of modifier or wild symbols to be added to the predefined number of symbols to be awarded. Although the examples provided herein relate to jackpot awards, it is to be understood that the features described herein are also applicable to non-jackpot awards. In further embodiments, the award values of the value-bearing symbols 442 may be awarded directly to a credit balance of a player in addition to or in place of providing the award value to one or more jackpot awards 442.

The jackpot awards 442 incorporate the award value of the value-bearing symbol 444 through any suitable function described herein. In example embodiment, the award value is added to one or more jackpot awards 442. In other embodiments, the award value may be distributed (equally or unequally) between a plurality of the jackpot awards 442. In further embodiments, the award value is multiplied when combining with one or more of the jackpot awards 442. In certain embodiments, combinations thereof and/or other suitable operations may be performed to change the jackpot awards 442 at least partially as a function of the award value of the value-bearing symbol 444.

In some examples, the award value of each value-bearing symbol 444 is added to each jackpot award 442 from the current jackpot award onwards. That is, if an award value of 4 is collected from a value-bearing symbol 444, then 4 is added to every jackpot award 442 presented on the game interface 400. In certain examples the current jackpot award linked to the player is not increased through the award values, and only the jackpot awards 442 that the player is still progressing towards are increased. In another example, the 4 is added to only a subset of the jackpot awards 442, such as the current and next jackpot awards. The subset may be predetermined, randomly selected, manually selected, and/or based on play of the game feature. In one example, the subset is based on the symbol positions occupied by the value-bearing symbols 444 (and/or other symbols), where each symbol position is associated with one or more jackpot awards 442. In another example, the subset is based on the number of one or more types of symbols within a game cycle outcome. In a further example, the subset may be based on distinguishable visual characteristics of the value-bearing symbol 444 (e.g., color or shape), where the characteristic is associated with one or more jackpot awards 442. In other examples, the subset includes at the least the next jackpot award 442 and a variable number of other jackpot awards 442.

For game cycle outcomes including a plurality of value-bearing symbols 444, the distribution of the award values may be the same or at least partially different for each value-bearing symbol 444. That is, the award values may be aggregated before application to the jackpot awards, or each award value may be treated independently to facilitate multiple methods of allocation, including allocation methods that do not award the full award value to each jackpot award 442.

In other examples, the award value is not directly awarded to each jackpot award 442, but rather a multiplier is applied to the award value prior to allocation to scale up or scale down the allocated amount to each jackpot award 442. The multiplier may be the same for all jackpot awards 442 or different to facilitate differentiate the allocated award value. In one example, the current jackpot award 434 may receive the full award value (i.e., multiplied by a multiplier of 1), while the remaining jackpot awards 442 receiving increasingly scaled-down award values. In another example, the multiplier may be based on the number of value-bearing symbols 444 and/or trigger symbols within a game cycle outcome. In yet another example, the multipliers may be based on characteristics of the symbol positions of the array 420 and/or whether the symbol positions are occupied or unoccupied. In a further example, the multipliers may be manually applied by the player. In certain embodiments, the multipliers may be limited to a maximum value of 1 and a minimum value of 0 (i.e., no award value is allocated). In other embodiments, the multipliers may exceed a value of 1 to facilitate multiplied award values. The multipliers may be applied to each collected award value or a subset of the award values collected over the game cycle outcomes.

In further examples, the award value (which may also be multiplied or otherwise adjusted prior to allocation) of a value-bearing symbol 444 may be divided between a plurality of jackpot awards 442. The divided award value may be allocated between all jackpot awards 442 or a portion of the jackpot awards 442. The allocated award value may be equal between jackpot awards 442 or inequal such that one jackpot award 442 receives a greater portion of the award values in comparison to another jackpot award 442. The division may be based on the current award level of the player, game performance (including the presence or absence of certain symbols or symbol combinations), player input, and the like.

Although the foregoing examples describe the allocation as limited to jackpot awards 442 of the current award level and remaining award levels to be achieved, it is to be understood that the award value may be allocated to previously acquired jackpot awards. In some embodiments, the player may receive each jackpot award for at least some of the achieved award levels. In such embodiments, the achieved jackpot awards continue to accrue award values from at least some of the value-bearing symbols 444. In certain embodiments, the current jackpot award 434 is prevented from accruing award values. That is, further adjustments to the jackpot value of any jackpot award may be locked in response to achieving the associated award level.

In certain embodiments, the modified value-bearing symbols 446 may be provided in the set of available symbols to provide additional functionality beyond the value-bearing symbol 444. Like the value-bearing symbol 444, the modified value-bearing symbols 446 include award indicia for visually indicating an associated award value. However, the modified value-bearing symbol 446 is visually distinguishable from the value-bearing symbol 444 to denote the difference in functionality. In the illustrated example, the shape of the value-bearing symbol 444 is a circle, while the modified value-bearing symbol 446 is a diamond. It is to be understood that the value-bearing symbols 444 and modified value-bearing symbols 446 may use any suitable form or visual characteristic to facilitate the player distinguishing between the two symbol types.

Moreover, the modified value-bearing symbols 446 are not limited to one type, but rather multiple types of modified value-bearing symbols 446 having respective functionality may be used in at least some embodiments. In one example, each modified value-bearing symbol 446 is linked to a subset of the jackpot awards 442, where the award value of the modified value-bearing symbol 446 is applied only to the linked subset. In another example, the award value of the modified value-bearing symbol 446 is multiplied prior to adding to one or more of the jackpot awards 442. In such an example, the multiplier may be visually associated with the modified value-bearing symbol 446 or the symbol position occupied by the symbol 446. In certain embodiments, the multiplier may be random or based on other aspects of the game, such as the number of symbols within the active array, the number of spins or game cycles left, and/or the number of collected symbols.

In some embodiments, the modified value-bearing symbols 446 are included within the set of available symbols to populate the active array 420. In other embodiments, the value-bearing symbols 444 are modified when populating the array 420 to result in the modified value-bearing symbols. The modification may be randomly applied or in response to one or more game events or conditions. In some embodiments, the modifier symbol 448 may be included to initiate such modification. In other embodiments, the modifier symbol 448 may have another suitable function for modifying the game feature as described herein. In one example, the modifier symbol 448 impacts application of any award values to the jackpot awards 442, such as multiplying the award value or redirecting the award values to a different one or more jackpot awards 442. In another example, the modifier symbol 448 is converted into one or more value-bearing symbols 444 in response to a combination of symbols within the array 420 or other suitable game conditions. In a further example, the modifier symbol 448 (or combinations of modifier symbols 448) affect the jackpot awards 442. That is, the modifier symbol 448 may add one jackpot award value to another jackpot award, multiply the jackpot award by a multiplier, and/or perform other suitable operations associated with the jackpot awards. In other examples, the modifier symbol 448 alters the progression path through the award levels, swaps awards and/or trigger conditions between award levels, adds new award levels, and/or removes award levels from the progression path. The modifications may be visually presented to the player through one or more animations to convey the change in the state of the game.

In some embodiments, the modifier symbols 448 (or combinations of the modifier symbols 448) may affect the active array 420. In one example, collecting one or more modifier symbols 448 may cause the array 420 to expand or otherwise change in size by adding, removing, or reorganizing symbol positions. Such use of the modifier symbols 448 may accelerate a predetermined change to the active array 420 (e.g., the change in response to transitioning to the next award level), or the change may be irrespective of any predetermined changes to the array 420. In certain embodiments, rather than change the size of the active array 420, the modifier symbols 448 may apply an effect to the underlying symbol (and/or nearby or adjacent symbol positions) such that subsequent symbols occupying the affected symbol positions may be changed or have an additional functionality. In one example, the affected symbol position may apply a multiplier to an award value of a value-bearing symbol 444 and/or convert the value-bearing symbol 444 to a modified value-bearing symbol 446.

In some embodiments, the additional spin symbol 450 is provided to facilitate extended the limited duration to collect a certain number of trigger symbols 432. That is, the additional spin symbol 450 adds one or more spins to the current count of the spin counter 435, thereby extending the duration of the game feature. The number of spins added per additional spin symbol 450 may be predefined (e.g., one additional spin), or the number of spins may vary based on characteristics of the additional spin symbol 450, random determinations, and/or the state of the array 420 and the symbols populating the array 420. In one example, similar to the value-bearing symbol 444, the additional spin symbol 450 includes indicia to visibly indicate the associated number of additional spins, which may be randomly selected from a set or range of available additional spin values.

The effect of the additional spins symbol 450 is not limited to addition, but rather at least some additional spin symbols 450 may reset the spin counter 435 to a predefined value (e.g., the initial value for the current award level). In certain embodiments, the trigger for adding additional spins is not the presence of one additional spin symbol 450, but rather includes collecting a predefined number of additional spin symbols, populating a certain area of the array 420 with the additional spin symbol 450, populating the array 420 with a particular arrangement of additional spin symbols 450 (e.g., along a payline), and/or other suitable triggers beyond the presence of the additional spin symbol 450. In at least one embodiment, combinations of the additional spin symbols 450 may alter the resulting change to the spin counter 435, such as increasing the number of added spins beyond the amount indicated by the additional spin symbols 450.

In certain embodiments, rather than dedicated additional spin symbols 450, other symbols may provide the functionality of the additional spin symbols 450. For example, the modified value-bearing symbols 446 or the modifier symbols 448 may also be configured to increase the spin counter 435. Similarly, any of the symbols described above and other symbols described elsewhere herein may be functionally incorporated with other symbols or otherwise removed from the game feature provided the function of the trigger symbols 432 is preserved. In one additional symbol example, certain trigger symbols may be counted as a plurality of trigger symbols within the collection monitored by the symbol counter 433. That is, collecting one modified trigger symbol will count as collected two or more regular trigger symbols 432. The modified trigger symbol may be visually distinguished from the regular trigger symbols, for example and without limitation, as appearing as a stack of trigger symbols within a symbol position or including other suitable visual distinctions to indicate the different functionality to the player.

The distribution of the award values, application of modifiers, types of trigger symbols, the functions of different symbol types, and/or other suitable game actions may not remain the same across all award levels. That is, progression to new awards levels may include randomly selecting symbols from a new set of available symbols (e.g., a weighted table of symbols), applying different modifiers, distributing award values between jackpots awards, and the like are variable between different award levels. In other embodiments, progression to different award levels may alter the rules and game structure of the game feature such that one or more objectives of the game may change between award levels. In certain embodiments, one or more award levels may share the same game parameters. It is to be understood that the foregoing game features and the game features described herein are configured to facilitate changes to game parameters based on the award level and/or how many award levels the player has achieved.

In certain embodiments, the game features described herein may include a plurality of progression paths of award levels, where play of the game feature may enable the player to progress through different award levels. Different trigger conditions and/or awards are provided for the different progression paths, and the trigger conditions may be at least partially different between the progression paths. In one example, the trigger symbols 432 and/or the value-bearing symbols 444 include visually distinguishable characteristics associated with one or more of the progression paths, where allocation of the trigger symbols 432 and/or the value-bearing symbols 444 is based on these characteristics. In another example, the symbol positions include these visually distinguishable characteristics. In a further example, where additional active arrays 420 are provided in addition to or in place of array expansion, each array 420 may be associated with a particular progression path and/or award level. The different progression paths may overlap each other and/or include the same or similar awards and/or trigger conditions in certain embodiments. In some embodiments, progression through the different progression paths may be competitive, where achieving the trigger condition of one progression path results in the corresponding award while the other paths provide no award.

FIGS. 10A-10D depict an example game interface 500 of a gaming system similar to the game interface 400 shown in FIG. 9 for play of an example game feature. More specifically, the game feature described herein includes value-bearing symbols and applying the award value of the value-bearing symbols to one or more of the jackpot awards of the game feature. The game interface 500 includes an active array 520, a trigger symbol counter 533, a spin counter 535, a set of jackpot awards 542 including a first jackpot award 534, a second jackpot award 536, and a third jackpot award 538 (shown in FIG. 10D), and one or more value-bearing symbols 544. In other embodiments, the game interface 500 may include additional, fewer, or alternative game and/or presentation elements, including those elements described elsewhere herein.

Figure 10A:
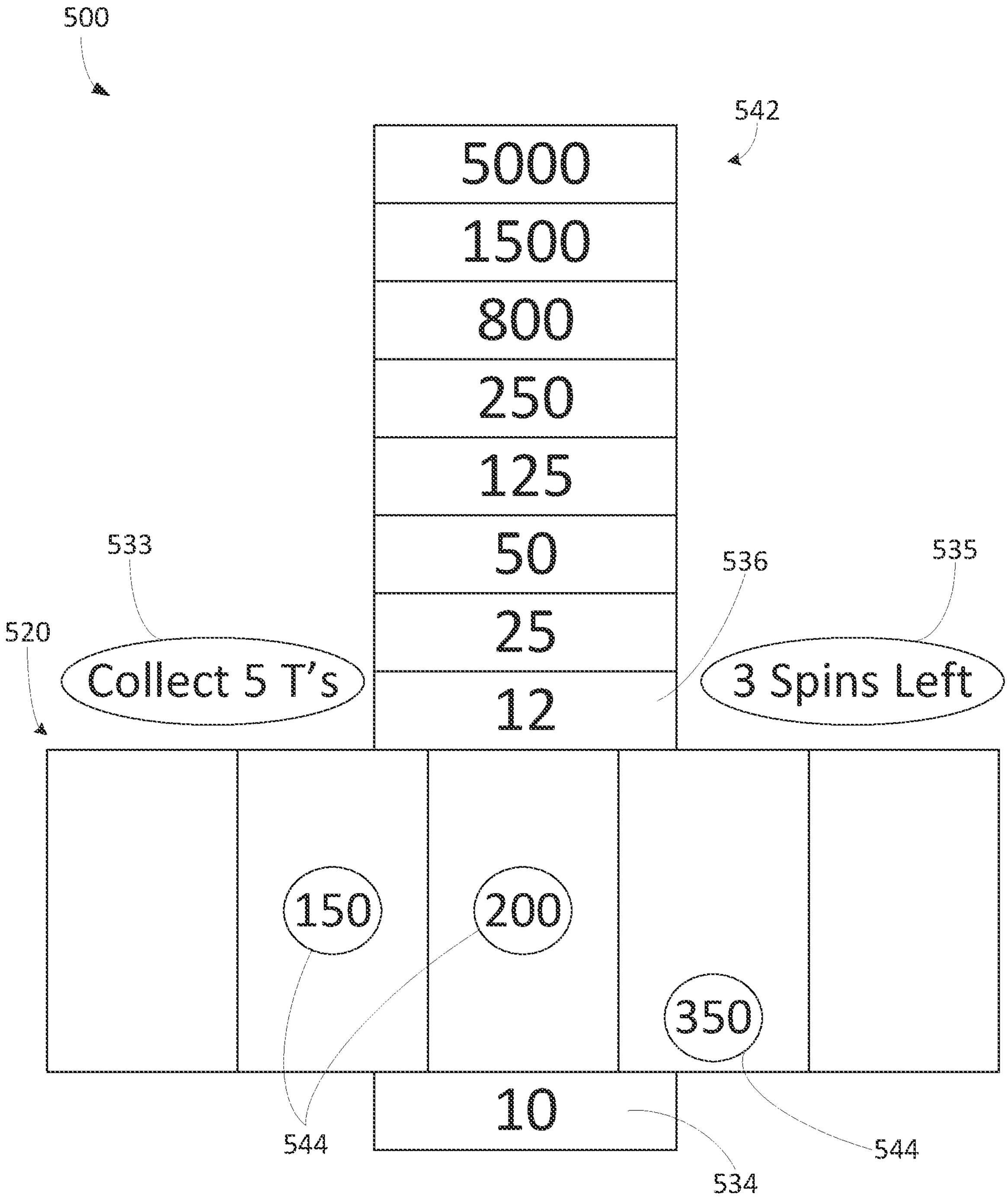
FIGS. 10A-10D depict an example game interface for a game feature including value-bearing symbols, according to one or more embodiments of the present disclosure.

FIG. 10A depicts the game interface 500 in a first state. The first state may be an initial state of the game feature or after the initial state of the game feature. In the first state, the active array has a symbol position configuration of 3×5. In the example embodiment, the player participating in the game feature (e.g., via a gaming machine of the gaming system) is at a first award level associated with the first jackpot award 534 such that concluding the game feature at the first award level results in the gaming system awarding the first jackpot award 534 to the player. In other embodiments, the first award level may not be associated with a jackpot award or any of the awards visibly shown in the interface 500 at the first state. That is, the first jackpot award 534 may be associated with the next award level beyond the current award level of the player.

In the first state, the symbol counter 533 and the spin counter 535 indicates the player must collect at least five trigger symbols within three spins or game cycle outcomes to satisfy the trigger condition of the second award level. In the example embodiment, the value-bearing symbols 544 described herein act as the trigger symbols. In other embodiments, additional or alternative symbols may selectively populate the active array 520. The value-bearing symbols 544 are depicted as circular symbols with a credit or award value visibly presented within each symbol 544. It is to be understood that any other suitable design, form, graphical elements, and the like may be used for the value-bearing symbols 544 and to convey the award value associated with each symbol 544. In the example embodiment, while the award values of the value-bearing symbols 544 and the jackpot awards 542 are credit values, the scale of the two value types is different. That is, an award value of 100 on the value-bearing symbols is equal to a value of 1 as presented by the jackpot awards (similar to the scale between a dollar and one cent). Other suitable scales between the values (including a 1:1 scale) may be used.

Figure 10B:
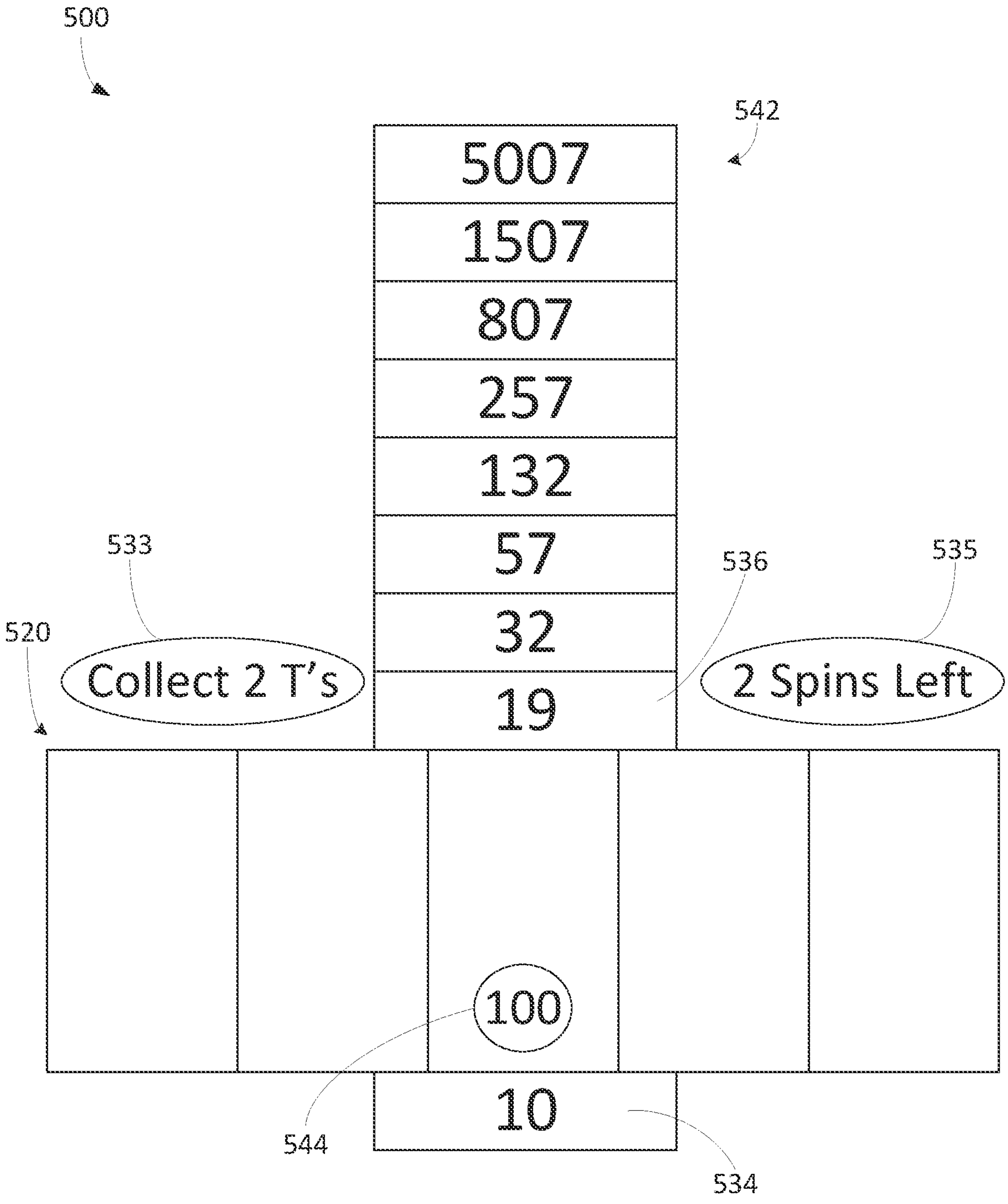

FIG. 10B depicts a second state of the game interface 500 immediately following the first state shown in FIG. 10A. In the first state, three value-bearing symbols 544 populated the active array 520 having award values of 150, 200, and 350. Although no other symbols are shown within the active array 520, other symbols may populate the other symbol positions. In certain embodiments, inactive symbols may populate the remaining symbol positions (i.e., symbols with no effect on the current game feature). The inactive symbols may be visually distinguished from active symbols to readily convey the difference between active and inactive symbols to the player. For example, the inactive symbols may be partially translucent, greyed out, or dimmed. In the example embodiment, the unpopulated symbol positions remain 'blank' rather than become populated with inactive symbols. Accordingly, to populate the active array 520 for a given spin or game cycle outcome, the gaming system is configured to select a symbol or a blank to occupy each symbol position of the array 520 based at least partially on one or more random outcomes (e.g., outcomes generated by a random number generator). One or more display devices of the gaming system then present one or more animation sequences generating the outcome of the spin by selectively populating the symbol positions, updating the counters 533, 535, and/or updating the jackpot awards 542.

In the example embodiment, the award values of the three value-bearing symbols 544 are added to each available jackpot award 542 presented by the game interface 500. That is, the aggregate award value of the value-bearing symbols in the first state is 700, which equals 7 on the scale of the jackpot awards. Each jackpot award 542 is updated independently to include the 7 from the value-bearing symbols as seen by the difference in the jackpot awards 542 between the first and second states. In the example embodiment, the current jackpot award 534 remains locked at the same value.

Any previously achieved award level (including the current award level) may remain fixed at the value at which the corresponding trigger condition was achieved. In other embodiments, other suitable methods of applying the award values of the value-bearing symbols 544 may be used, including those described elsewhere herein. For example, the current jackpot award 534 may be updated with the other jackpot awards 542 shown in the second state of the game interface 500.

In some examples, at least some jackpots do not receive the full aggregated award value and/or some jackpots may not be funded at all by the value-bearing symbols 544. The aggregated award value may be divided between at least a portion of the jackpot awards 542. The division of the aggregated award value may be equal between the jackpot awards 542 or inequal. That is, at least one jackpot award may receive a larger portion of the aggregated award value than another jackpot award. In one example, the second jackpot award 536 receives the largest portion of the aggregated award value, and distribution the remaining aggregated award value decreases through the award levels. In another example, the allocation is distributed such that the higher award levels receive larger portions of the aggregated award value. In some examples, the aggregated award value is not divided, but rather the allocation to at least some of the jackpot awards 542 is scaled based on the aggregated award value. For example, the first jackpot award 534 may receive 100% of the aggregated award value, while the highest jackpot award receives 5% of the aggregated award value. The highest award levels may receive lower allocations of the award values in at least some embodiments due to the volume of value-bearing symbols 544 required to achieve these award levels. In other examples, the award value of each value-bearing symbol 544 may be distributed independently, thereby enabling different allocation schemes for each value-bearing symbol 544. In at least one embodiment, each value-bearing symbol 544 is randomly distributed to one or more of the jackpot awards 542. In some embodiments, the value-bearing symbols 544 and/or the symbol positions of the active array 520 include characteristics that indicate which jackpot awards 542 receive the corresponding award value. In one example, the symbol positions and/or the value-bearing symbols 544 include colors, backgrounds, and/or other visual elements mapped to one or more of the jackpot awards 542 to identify which jackpot awards 542 receive the award value. In certain embodiments, the player may be prompted to provide player input to map these characteristics between the jackpot awards 542, the value-bearing symbols 544, and/or the symbol positions. In other embodiments, after the game cycle outcome is presented in the first state, the player may be provided the option to provide player input to manually distribute or allocate at least one of the award values. To encourage the player to select higher award levels, multipliers may be combined with the award values to increase the allocated award value at higher award levels.

Figure 10C:
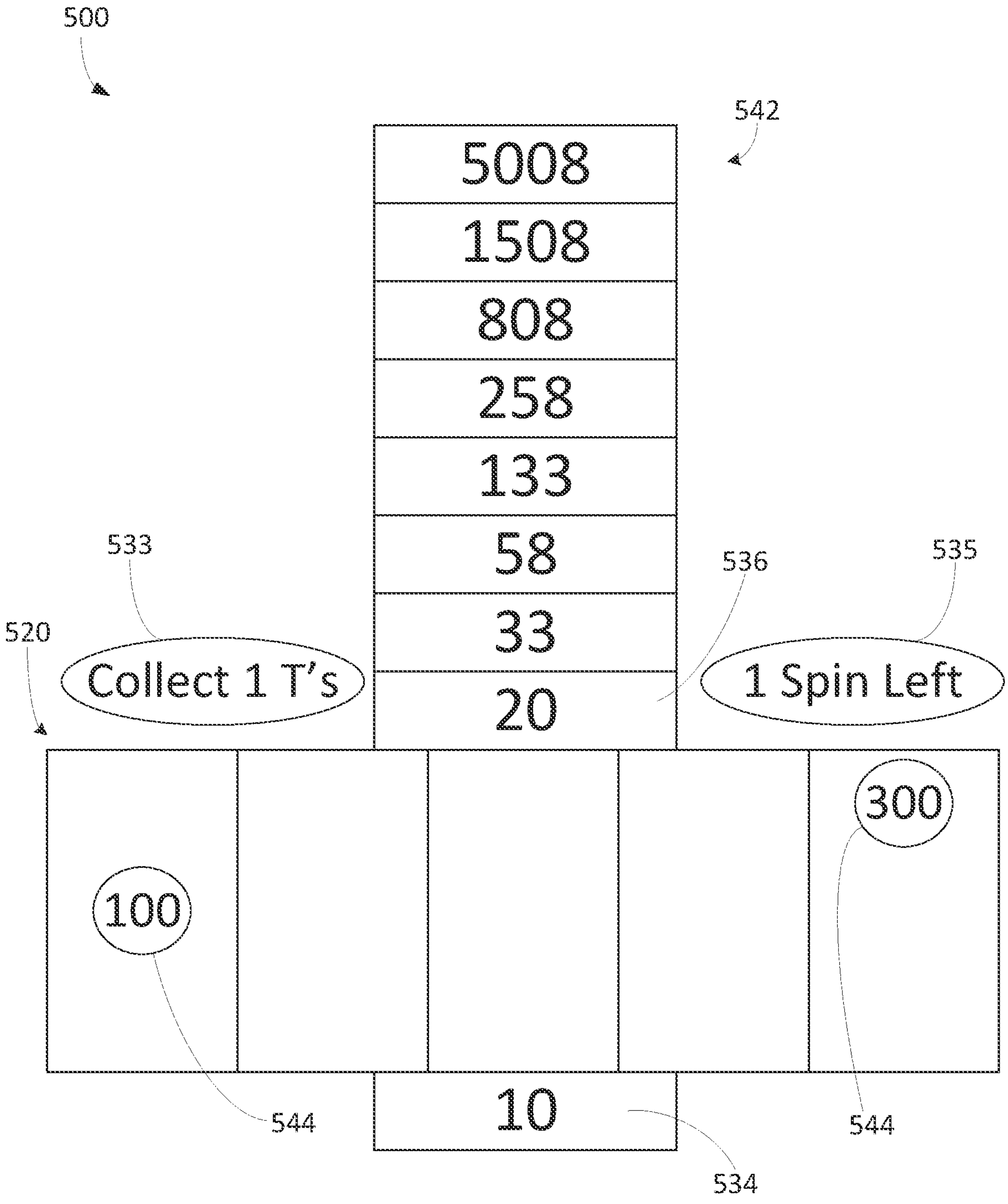

In the example embodiment, FIG. 10C depicts the game interface 500 in a third state following the second state. In the second state, one value-bearing symbol 544 having an award value of 100 credits (which is converted to 1 for the jackpot awards) is collected. Accordingly, in the third state shown in FIG. 10C, the symbol counter 533 has been updated by decrementing one from the current count, and the spin counter 535 has been decremented to leave one spin left to collect the remaining number of trigger symbols (i.e., one more value-bearing symbol 544). Like the transition between the first and second states, the jackpot awards 542 are updated to include the aggregated award value of any value-bearing symbols 544 populating the array 520 in the second state. In this example, each jackpot award 542 except for the current jackpot award 534 is incremented by one based on the award value of the one value-bearing symbol 544 within the second state.

The third state represents a game cycle outcome or spin outcome following the game cycle outcome shown in the second state. Between the second and third states, one or more animations and/or other presentation elements are provided using the game interface 500 and/or via other suitable presentation devices (e.g., speakers, lighting assemblies, additional display devices, etc.) to convey a spin or game cycle to the player. In one example, reels associated with the symbol positions of the active array 520 are animated to spin or cycle through a plurality of available symbols (which may include blanks in certain embodiments) before stopping on the symbols forming the game cycle outcome. In another example, non-reel-based animations may be used for the game cycle or spin.

In the example embodiment, the third state includes two value-bearing symbols 544 having award values of 100 and 300, respectively. Collecting two value-bearing symbols 544 meets and exceeds the number of trigger symbols to collect for the first award level. In the example embodiment, the aggregated award value of the two value-bearing symbols 544 is applied to each of the jackpot awards 542, which includes the first jackpot award 534. In at least this embodiment, achieving the trigger condition for the second award level (i.e., collecting the number of trigger symbols within a given number of spins as indicated by the symbol counter 533 and the spin counter 535) causes the second jackpot award 536 to be linked to the player. Any jackpot awards (or other non-jackpot awards) linked to the player at the conclusion of the game feature or at detecting of an award condition (which may occur prior to completing the game feature) are awarded to the player. In some embodiments, one award is linked to the player at a given time such that awards having a greater value replace jackpot awards of lesser values. In certain embodiments, particularly embodiments with branching award paths or various types of awards, the player may be provided the option to select which achieved award is to be linked to the player. In other embodiments, multiple awards are linked to the player at a given time. In one example, every jackpot award 542 achieved by the player is aggregated together to be provided as an aggregated jackpot award to the player. In another example, one jackpot award 542 and one non-jackpot award are linked to the player at a time.

In the example embodiment, the aggregated award value of the value-bearing symbols 544 in the third state is applied to the second jackpot award 536 such that the second jackpot award 536 is updated from 20 to 24. After updating the second jackpot award 536, the second jackpot award 536 may then be locked or frozen at the current jackpot value. That is, subsequent value-bearing symbols 544 collected within the game feature are not applied to the second jackpot award 536, even if the next award level is not achieved and the player is awarded the second jackpot award 536. In other embodiments, the second jackpot award 536 remains unlocked to include award values of subsequent value-bearing symbols 544 at least until the next award level is achieved and up to the conclusion of the game feature.

In certain embodiments, the second jackpot award 536 may be locked in response to achieving the trigger condition and irrespective of any additional value-bearing symbols 544 within the array 520. That is, in the third state, only one value-bearing symbol 544 is required to achieve the trigger condition of the second award level, thereby leaving one of the two value-bearing symbols 544 beyond the requirement of this condition. In such embodiments, one of the value-bearing symbols 544 is selected to be applied to the second jackpot award 536 and the remaining value-bearing symbol 544 is applied to one or more subsequent jackpot awards 542. The selection may be based on random outcomes, player input, the award values of the value-bearing symbols 544, the position of each value-bearing symbol 544 within the array 520, and/or other suitable factors. In certain embodiments, the award value of any unselected value-bearing symbol 544 may be modified (e.g., multiplied) prior to being applied to the jackpot awards 542.

Figure 10D:
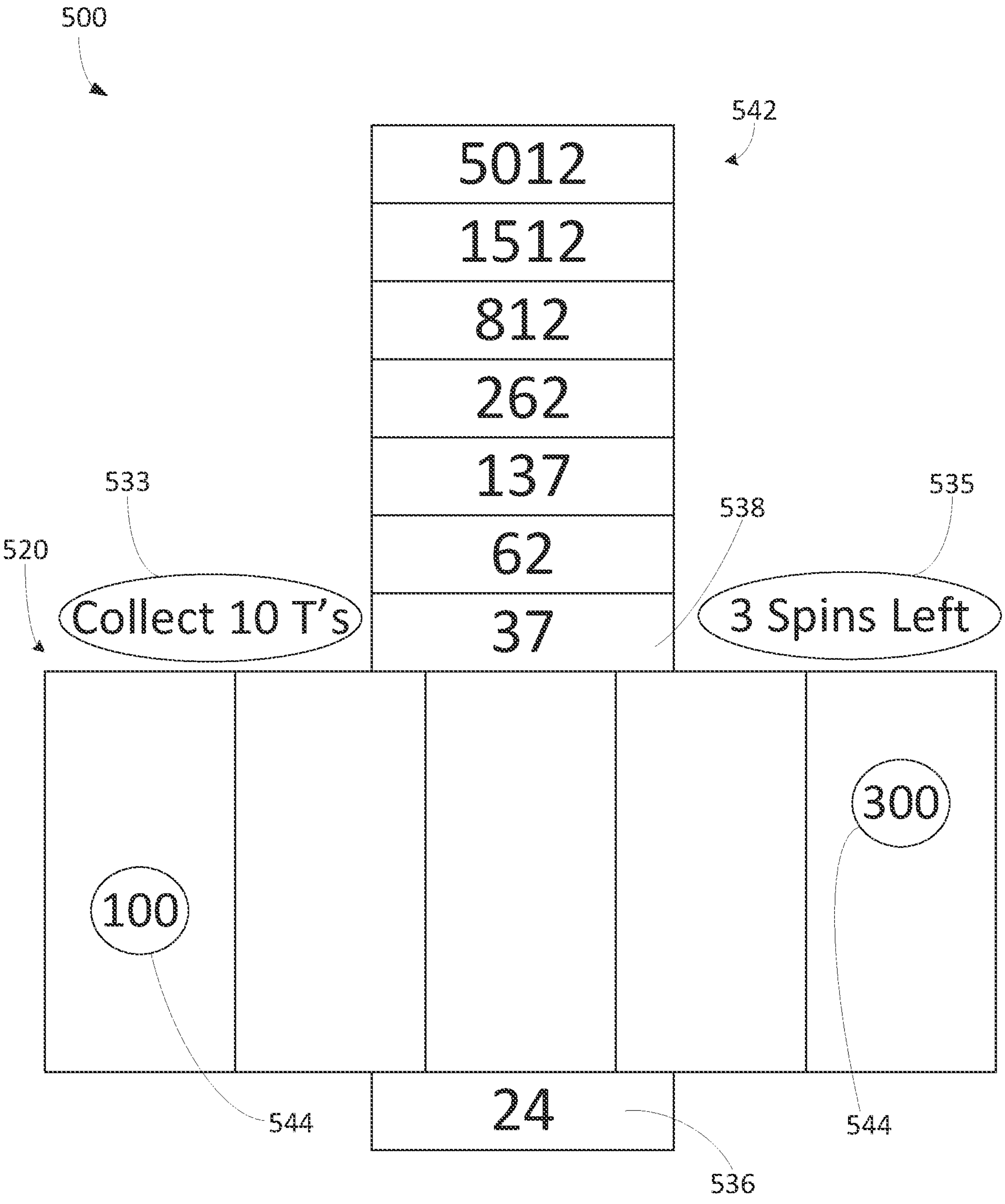

FIG. 10D depicts the game interface 500 in a fourth state following the third state. More specifically, the fourth state depicts a game cycle outcome following the game cycle outcome shown in the third state. Between the third and fourth states, the active array 520 has expanded to include a new row of additional symbol positions. Additionally, the first jackpot award 534 is removed from the interface 500, and the second jackpot award 536 occupies the position previously occupied by the first jackpot award 534 to reflect the second jackpot award 536 becoming the current jackpot award linked to the player. As a result of the changes to the second jackpot award 536 and the active array 520, a third jackpot award 538 is positioned adjacent to the array 520 in the fourth state.

As stated previously with respect to the third state, the jackpot awards 542 (including the second jackpot award 536) are updated to include the aggregate award value of 400 from the value-bearing symbols 544 within the third state as shown in the difference in the jackpot award values 542 between FIGS. 10C and 10D. Additionally, because the player has progressed to the next award level, a new trigger condition associated with the third award level is presented via the game interface 500. More specifically, the symbol counter 533 and the spin counter 535 are updated to respective initial value associated with the trigger condition. In this example, to achieve the trigger condition of the third award level and continue the game feature, the player is required to collect ten trigger symbols (i.e., value-bearing symbols 544) within three spins. It is to be understood the trigger conditions depicted in FIGS. 10A-10D are for exemplary purposes only and are not intended to limit the configuration of the game feature. Other suitable trigger conditions requiring different numbers of trigger symbols within different numbers of spins may be used, including those described elsewhere herein (e.g., the table shown above with respect to FIGS. 7A and 7B).

In the example embodiment, the trigger condition for a given award level is initiated in response to the achieving the trigger condition of the previous award level. In some embodiments, the trigger condition is initiated for the next game cycle outcome. In other embodiments, the trigger condition may be initiated for the same game cycle outcome as the outcome achieving the trigger condition of the previous award level. That is, in such embodiments, any value-bearing symbols 544 collected in excess of the previous trigger condition in a game cycle outcome may be applied to the next trigger condition (with or without decrementing the spin counter 535). In certain embodiments, the number of symbols to be collected for each trigger condition of the award levels may be active through all the game cycle outcomes of the feature. For example, while the player is collecting symbols for the second jackpot award 536, the collection of symbols for the third jackpot award 538 may also be active. Collected trigger symbols may be applied to one, some, or all of the award levels with active symbol collection. In some examples, the value-bearing symbols 544, the symbol positions of the active array 520, and/or other suitable modifiers visually indicate which award levels receive the value-bearing symbols 544. In another example, each value-bearing symbol 544 is randomly allocated to one or more award levels. In further examples, the collected symbols are applied equally to the trigger conditions of the award levels. In certain embodiments, the trigger condition is not based on the number of collected symbols, but rather the respective jackpot values, wherein achieving the trigger condition of a given level includes meeting or exceeding a threshold jackpot value. In this example, all trigger conditions may be active at a given time.

In the example embodiment, the player progresses through the game feature by achieving the trigger conditions of the award levels. For each award level achieved by the player, the jackpot award 542 linked to the player is modified or replaced, and the active array 520 is adjusted to match an array size associated with the current award level. In this example shown in the game interface 500, changes to the array size include adding additional rows to the array 520. In other embodiments, other suitable changes to the array size may be used, such as adding additional columns, adding partial rows, adding partial columns, and the like. In certain embodiments, no changes are made to the active array 520 and/or additional arrays are presented within the game interface 500. Progression may continue until the player fails to complete a trigger condition, the player reaches the maximum award level, and/or another suitable termination condition is met. At this point, the game feature may reset or conclude.

At the conclusion of the game, the game interface 500 and/or other suitable presentation devices present an award sequence. The award sequence includes one or more animations, graphical elements, video clips, audio clips, tactile feedback, lighting sequences, and the like to engage the player and indicate to the player one or more awards collected by the player through at least the game feature associated with FIGS. 10A-10D. The one or more awards include, for example, the one or more jackpot awards 542 currently linked to the player. In the example embodiment, the player is linked to the jackpot award 542 associated with the most recent award level achieved by the player. For example, if the game feature concluded at the fourth state shown in FIG. 10D, the player would receive the second jackpot award 536. In other embodiments, the player is provided additional or alternative awards based at least in part on play of the game feature, including those awards described elsewhere herein. In certain embodiments, the award sequence may not be limited to conclusion of the game feature, but rather may also be provided at other game states. Accordingly, the award sequence may be initiated in response to one or more award conditions (e.g., conclusion of the game feature, detecting certain symbols or symbol combinations, etc.).

The provided award may be applied to a credit balance of the player. The player may continue to play one or more games using the credit balance or the player may initiate a cashout sequence to convert or otherwise store the credit balance for subsequent use (either at the gaming machine presenting the game interface 500 or elsewhere). In at least some embodiments, conclusion of the game feature may result in the underlying game to progress to a different game feature, such as a base game feature. At the base game feature in such embodiments, the presentation of the base game feature includes an option for the player to provide player input to initiate the cashout sequence. The cashout sequence may include, for example, printing or distributing one or more physical items (e.g., ticket, coin, bill, and/or card) to the player representing the credit balance, synchronizing the credit balance to an account or digital wallet associated with the player, and/or prompting the player to retrieve the credit balance through a player computing device (e.g., a smartphone). The use of a player computing device to retrieve the credit balance may include, for example, scanning a visually-presented identifier (e.g., barcode, matrix barcode, text identifier, and/or other visual identifier), receiving or transmitting an audio signature associated with credit balance transfer, and/or establishing data communication with the gaming machine through near-field communication (NFC), Bluetooth, Wi-Fi, and/or other suitable data communication schemes.

Figure 11:
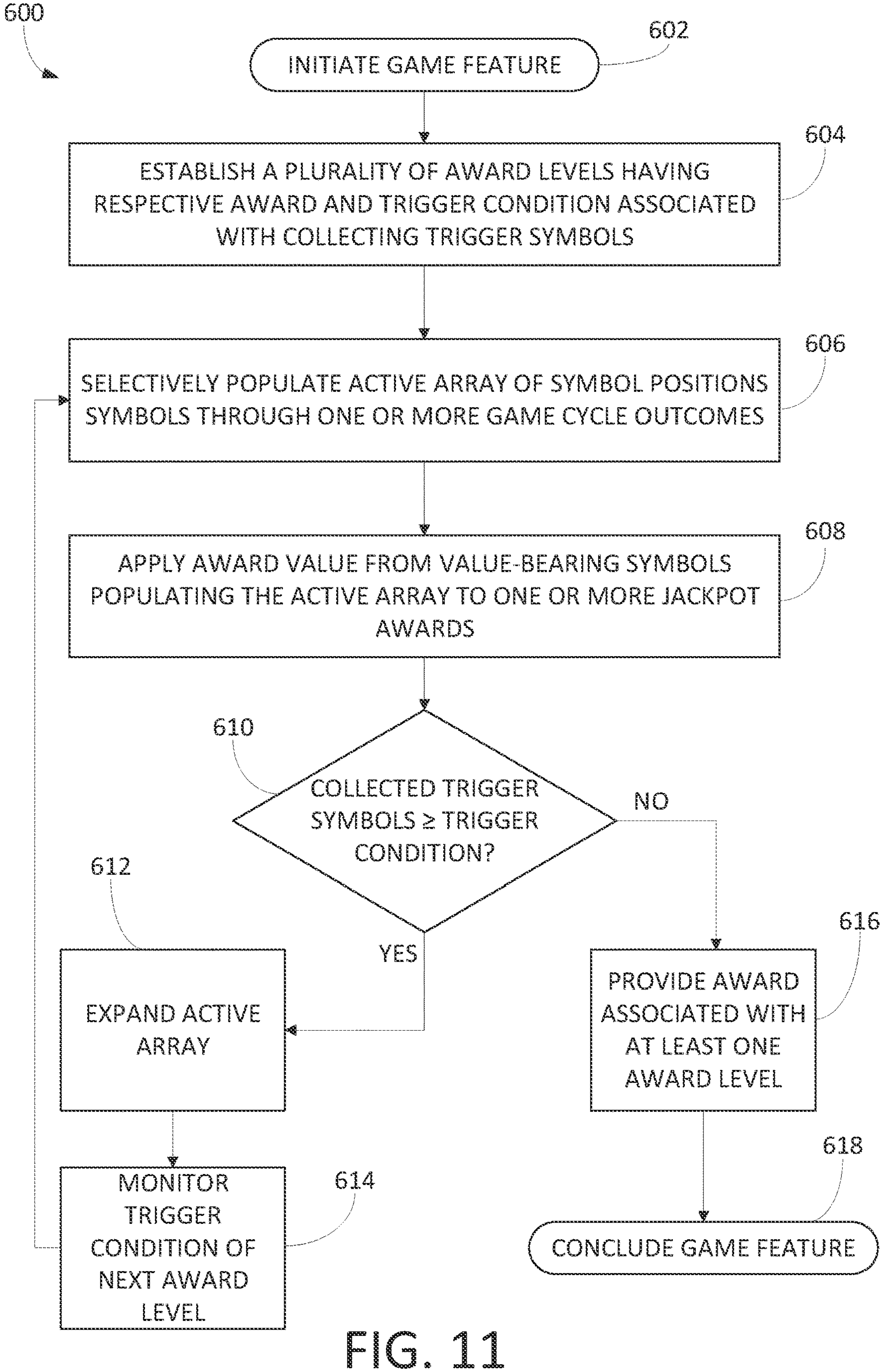

FIG. 11 is a flow diagram of an example method 600 for providing a game feature with dynamic jackpot awards using a gaming system (such as the gaming system shown in FIGS. 1 and 2). The method 600 is at least partially performed by game-logic circuitry associated with a gaming machine having one or more display devices for presenting the game feature. In other embodiments, the method 600 may be performed by other suitable devices of the gaming system and/or may include additional, fewer, or alternative steps, including those described elsewhere herein.

At step 602, the game feature is initiated. In the example embodiment, the game feature associated with the method 600 is a bonus game feature of a game including at least a base game feature. To participate in the bonus game feature, the player participates in the base game feature and, in response to a bonus game trigger event being detected, initiates the bonus game feature. The play of the base game feature and the initiation of the bonus game feature may be like the features described with respect to FIG. 8A.

At step 604, within the initiation of the bonus game feature, the game-logic circuitry establishes a plurality of award levels and causes a display device of the gaming machine to present an active array in an initial state associated with a first award level. Establishing the award levels includes establishing a progression path through the award levels and establishing respective awards and respective trigger conditions for each award level. The progression path indicates how the player progresses through the award levels in response to satisfying the trigger conditions as described herein. In the example embodiment, at least a portion of the awards are jackpot awards. The jackpot awards may be initiated at predetermined, initial jackpot values or may be progressive jackpot awards that are funded through wagers and other credit inputs from players. Other award types and the trigger conditions likewise may be established at predetermined values or dynamic values. Play of the game feature and/or other parameters associated with the game may affect these values. For example, different initial values may be used based on the wager history of the player and/or base game performance.

The trigger conditions for each award level are at least partially associated with collecting trigger symbols as described herein. In the example embodiment, the trigger condition for a given award level includes collecting a predefined number of trigger symbols over a predefined set of game cycle outcomes (e.g., spins). In some embodiments, the trigger conditions may be active only for after achieving the trigger conditions of the previous award level. In other embodiments, the trigger conditions may be active even while the player progresses through other award levels. In certain embodiments, at least a portion of the trigger conditions may be shared with other trigger conditions. For example, the predefined number of game cycle outcomes may be associated with a plurality of the trigger conditions such that the player collects trigger symbols for a plurality of award levels over one set of game cycle outcomes.

In at least some embodiments, in addition to establishing the awards and trigger conditions of each award level, establishing the award levels includes establishing an array size of an active array for each award level. That is, the active array is dynamically adjusted to the array size of the current award level. In the example embodiment, each subsequent award level increases the array size by one additional row of symbol positions. In other embodiments, other suitable changes to the array size (including decreases in array size) may be used between adjacent award levels. In certain embodiments, the changes to the active array are not predefined, but rather may be random and/or based on conditions of the game feature (e.g., collecting certain symbols, certain symbol combinations, etc.). In further embodiments, no changes to the array size are associated with each award level.

Other aspects of the game feature may be different between the award levels. Establishing the awards levels may include retrieving and/or generating the game parameters for each award level. In one example, each award level includes a different weighted table for randomly selecting symbols or blanks to populate the active array, which may include additional, fewer, or alternative symbols. In another example, each award level includes a different weighted table for generating award values of each value-bearing symbol. In a further example, the rules of the game may be adjusted between each award level.

In at least some embodiments, the display device is configured to present visual representations of at least some award levels with the active array, thereby enabling the player to visualize the progression path through the award levels. In the example embodiment, the trigger condition of the current award level (and other award levels, in some embodiments) is also presented to clearly indicate the parameters for the player to extend play of the game feature. In one example, the display device presents the awards associated with each award level and one or more counters for monitoring the remaining symbols to be collected and the remaining game cycle outcomes for the current trigger condition.

In the example embodiment, the player is linked to an award of an initial award level at the initiation of the game feature. That is, even if the player does not collect the predefined number of trigger symbols, the player is provided the award for the initial award level. In such embodiments, the trigger condition for the second award level is presented at the initial state of the game feature prior to presenting any game cycle outcomes. In other embodiments, the player is not initially linked to an award, and therefore may be required to satisfy the initial trigger condition to receive an award for the game feature.

At step 606, the game-logic circuitry causes the display device to selectively populate the active array with symbols through one or more game cycle outcomes. The selective population includes randomly selecting a symbol or blank from a set of available symbols (which may include one or more blanks and/or inactive symbols). The available symbols include at least one type of trigger symbol. As set forth above, collection of the trigger symbols is used to progress through the game feature. In the example embodiment, the trigger symbols include value-bearing symbols. The available symbols may include additional or alternative types of trigger symbols. That is, in certain embodiments, the value-bearing symbols are not trigger symbols, but rather other trigger symbols are included with the value-bearing symbols within the available symbols. Selection of the symbols to generate the game cycle outcome is performed by the game-logic circuitry, and the game-logic circuitry then causes the display device to present the game cycle outcome.

For each game cycle outcome, one or more animations and/or other presentation elements are used to delineate between adjacent game cycle outcomes and enable the player to identify any events occurring within each game cycle outcome. In some embodiments, the player may be prompted to provide player input to initiate each game cycle outcome. In certain embodiments, the presentation of the game cycle outcomes and the underlying game cycle outcome determinations are separate such that the game-logic circuitry may generate a plurality of game cycle outcomes at once irrespective of the presentation of the game cycle outcomes. In other embodiments, each game cycle outcome is generated and presented sequentially.

For each game cycle outcome, trigger symbols occupying the active array are "collected" by tracking a current count of trigger symbols. Tracking of the trigger symbols may be performed by decrementing the predefined number of trigger symbols specified by the trigger condition, incrementing the current count of trigger symbols for comparison to the predefined number of trigger symbols, and/or other suitable methods of tracking the trigger symbols. In some embodiments, the trigger symbols may persist on the array through subsequent game outcomes. In the example embodiment, the trigger symbols are removed prior to the next game cycle outcome, thereby facilitating collecting of a number of trigger symbols exceeding the number of symbol positions within the active array.

At step 608, for each game cycle outcome, the award values of any value-bearing symbols occupying the active array are applied to at least one jackpot award of the award levels. In the example embodiment, the aggregated award value of the value-bearing symbols is applied to the jackpot awards of all award levels that the player has not yet achieved (including the current award level that the player is progressing to achieve). In other embodiments, other suitable allocation schemes (including a plurality of allocations used for different value-bearing symbols) may be used to apply the award values to one or more jackpot awards. In certain embodiments, the application of award values is not limited to jackpot awards, but rather may be converted to other types of awards to facilitate additional dynamic awards. For example, the award values may be converted for updating a free spins award and/or bonus symbol award.

The collection of the trigger symbols and the application of the award values of the value-bearing symbols may be conveyed to the player through one or more animations. In the example embodiment, the value-bearing symbols are also the trigger symbols, and at least some animations using the value-bearing symbols may be used to convey both the collection and award value application. Applying the award values to the jackpot awards may include updating a visual presentation of the jackpot awards to include the applied award values. In one example, the jackpot awards are represented through numerical values presented by the display device, and these numerical values are increased based on the award values of the value-bearing symbols.

In the example embodiment, like the embodiments shown in FIGS. 5A-7B and 10A-10D, the symbols populating the active array for each game cycle outcome are removed or otherwise replaced by the symbols and blanks of the next game cycle outcome. In other embodiments, one or more types of symbols may be held for one or more subsequent game cycle outcomes on the array. The held symbols may be used to occupy certain symbol positions and/or to trigger certain game events based on combinations of held symbols in at least some embodiments. In the transition between two award levels as described herein, any held symbols may be removed from the array, thereby resetting or clearing the symbol positions for subsequent population.

At step 610, the game-logic circuitry is configured to determine whether the number of collected trigger symbols meets or exceeds the threshold amount of trigger symbols of the trigger condition. The determination of step 610 may occur in response to each game cycle outcome or at conclusion of the set of the game cycle outcomes allocated at the initiation of the trigger condition. In at least some embodiments, the determination of step 610 also includes determining whether the allocated number of game cycle outcomes has expired. As each game cycle outcome is presented, the game cycle outcome counter is updated. In the example embodiment, the game cycle counter is decremented for each game cycle outcome until a termination count is met (e.g., zero). In other embodiments, the game cycle counter visually conveys the current game cycle count and/or the termination count to the player in another suitable manner. If the determination at step 610 indicates the collected trigger symbols matches or exceeds the threshold number of symbols of the current trigger condition, the method 600 proceeds to step 612. Otherwise, the method 600 progresses to step 616. It is to be understood that, for the highest award level at the end of the progression path, the method 600 may progress to step 616 rather than step 612 irrespective of the number of trigger symbols collected by the player.

At steps 612, and 614, the player has met the trigger condition of an award level, and therefore the player progresses to the next award level. More specifically, at step 612, the active array is expanded or otherwise adjusted, which may be based on an array size associated with the next award level, and, at step 614, the game-logic circuitry monitors the trigger condition of the next award level. Monitoring the trigger condition may include, for example, setting the symbol counter and the game cycle counter to initial values associated with the award level. In other embodiments, the symbol counter and/or the game cycle counter are not initiated at the transition to the next award level, but rather may already be monitored prior to transitioning to the next award level. The game-logic circuitry causes the display device to update to reflect the changes of steps 612 and 614 before continuing steps 606-610 for up to the number of game cycle outcomes associated with the trigger condition.

In some embodiments, in addition to the steps 612 and 614, transitioning to a new award level may affect the set of available symbols for populating the array and/or the award values of the value-bearing symbols. That is, additional, fewer, or alternative symbols may be included in the set of available symbols, and the symbols may have different weighting factors that impact the random selection of the symbols. The award values, like the symbols, may also be altered to change which award values are associated with the value-bearing symbols. In one example, as the player progresses through the award levels, the chance of a higher value award value occurring may increase or decrease.

In the example embodiment, in addition to steps 612 and 614, the game-logic circuitry links the award of the achieved award level to the player. The linked award may replace a preexisting linked award, alter the preexisting linked award (including forming an aggregate linked award), and/or may be applied in other suitable manners. In certain embodiments, the linked award does not affect preexisting linked awards such that all linked awards are provided to the player (or a selection from the linked awards is made as described herein). In some embodiments, at least a portion of the award linked to a player may be applied immediately, such as awards for additional game cycle outcomes or bonus symbols. Other awards, such as jackpot awards, are linked to the player until conditions are met to initiate an award sequence.

At step 616, the game-logic circuitry initiates an award sequence by providing an award associated with at least one award level via the display device. More specifically, in at least some embodiments, the game-logic circuitry provides one or more linked jackpot awards from the award levels achieved by the player within the game feature. Other suitable awards may be provided within the award sequence in addition to the linked jackpot awards. For embodiments with multiple linked jackpot awards, all, some, or one of the jackpot awards may be provided. The display device presents one or more suitable animations and/or presentation elements (which may be combined with presentation elements of other presentation devices) for the animation sequence to convey the provided award to the player.

In the example embodiment, in response to the award sequence, the game feature is concluded at step 618. Concluding the game feature may cause the game to also conclude (i.e., the gaming session of the player is terminated), or another game feature or game is initiated. In the example embodiment, concluding the game feature of the method 600 causes the base game feature to be initiated, thereby forming a game loop where play of the base game feature triggers the bonus game feature and concluding the bonus game feature returns to the base game feature until a bonus game trigger event is detected again. In other embodiments, the award sequence of step 616 is not necessarily tethered to concluding the game feature. That is, the award sequence may be triggered by game events or award conditions present within the bonus game feature prior to the determination of step 610 progressing to step 616. In one example, collecting certain award symbols or detecting a particular combination of symbols in the active array triggers the award sequence, which may enable the player to receive multiple awards before the game feature concludes.

In some embodiments, in addition to or in place of the aspects of the foregoing game features, the game feature may include game elements to affect or modify the progression path through the award levels. That is, the player may deviate from a predefined path in response to one or more game events, game conditions, player inputs, and the like, including progression 'backwards' to a previous award level as described herein. Changing the path may include, for example and without limitation, skipping certain award levels, adding additional award levels, altering upcoming award levels (e.g., modifying the trigger condition and/or award), and the like. Changing the path may include swapping certain aspects of the award levels (e.g., the trigger conditions, the awards, and/or the array sizes) with other award levels.

Figure 12A:
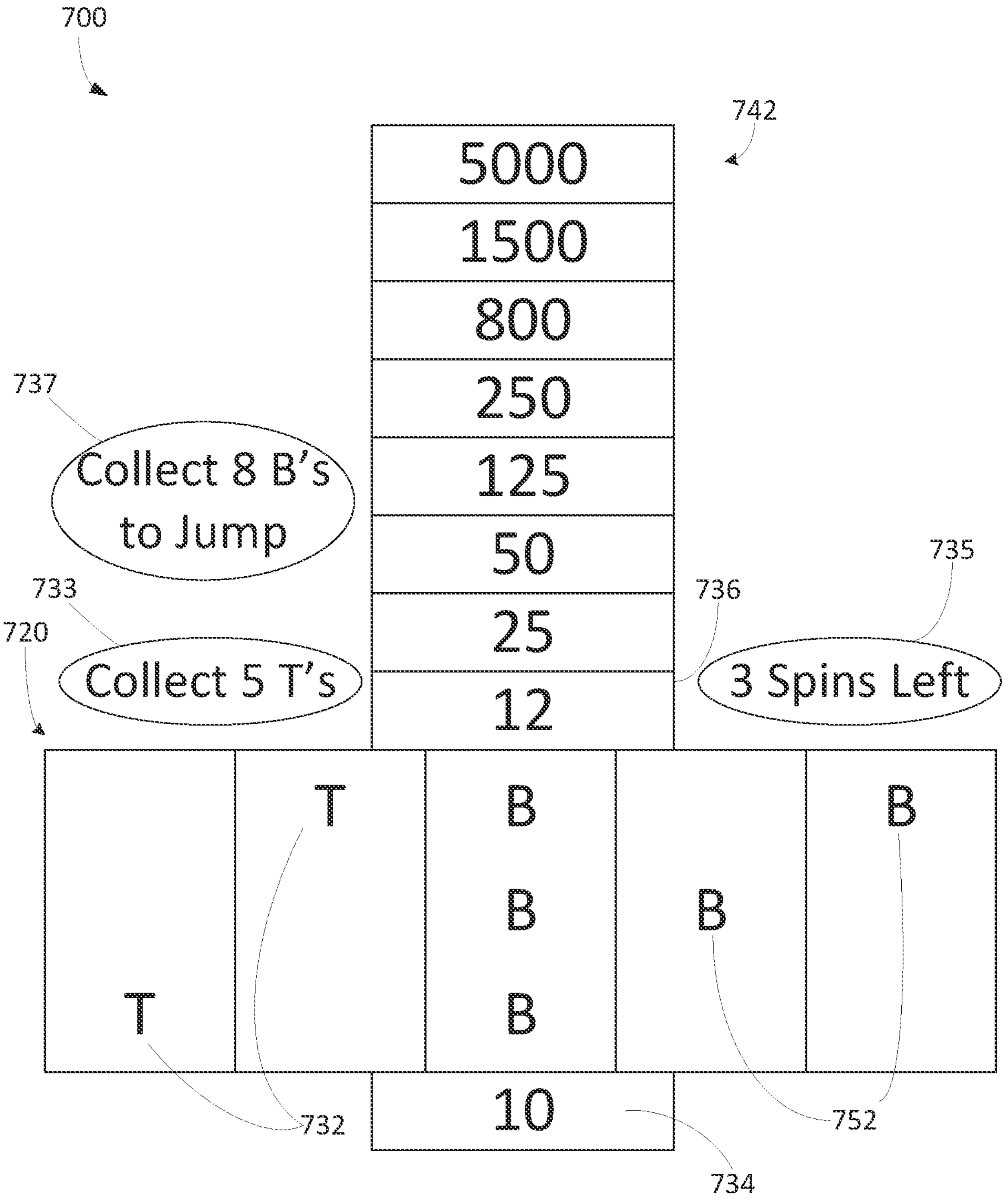
FIGS. 12A-12B depict an example game interface for a game feature including branching progression paths through a plurality of award levels, according to one or more embodiments of the present disclosure.
Figure 12B:
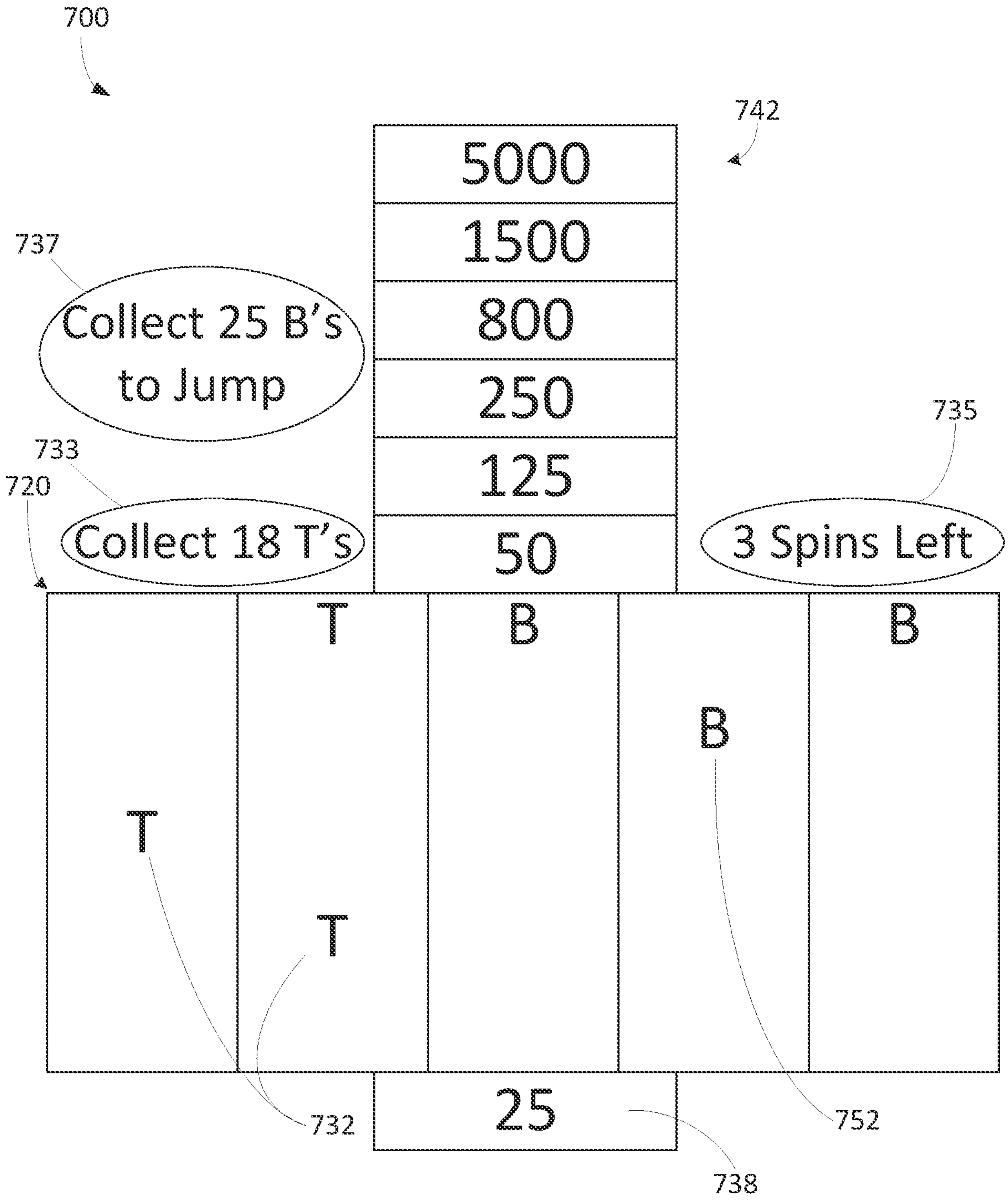

FIGS. 12A and 12B depict an example game interface 700 for a gaming system conducting a game feature with branching or dynamic progression paths. More specifically, FIG. 12A depicts the game interface 700 in a first state and FIG. 12B depicts the game interface 700 in a second state subsequent to the first state. In the example embodiment, the game interface 700 is similar to the game interfaces shown in FIGS. 5A-7B, 9, and 10A-10D. More specifically, the game interface includes an active array 720 of symbol positions, trigger symbols 732, a symbol counter 733, a first jackpot award 734, a game cycle counter 735, and a set of jackpot awards 742. In other embodiments, the game interface 700 may include additional, fewer, or alternative elements for the game feature described herein, including those described elsewhere herein.

In the example embodiment, the game interface 700 is associated with a game feature facilitates altering the predefined progression path through the award levels represented by the jackpot awards 742. More specifically, collecting branch symbols 752 to meet or exceed a branch threshold value causes the progression path to be altered. The branch symbols 752 may be any suitable type of symbol or combinations of types of symbols, including value-bearing symbols, at least some trigger symbols, and the like. In one example, the branch symbols 752 are modified value-bearing symbols. In another example, the branch symbols 752 have no other function other than to be collected for adjusting the progression path.

Collection of the branch symbols 752 is visually monitored through a branch symbol counter 737. Although the branch symbol counter 737 indicates collection of 8 branch symbols 752 is required to alter the progression path, other suitable numbers of branch symbols 752 may be required. In some embodiments, the branch symbol counter 737 is reset for each award level such that progression through the award levels results in the collection of branch symbols 752 in the previous award level being reset. In other embodiments, the branch symbol counter 737 may not reset between each award level, but rather continues for at least one subsequent award level and/or until the threshold number of branch symbols 752 are collected.

In the first state shown in FIG. 12A, a game cycle outcome includes five branch symbols 752 occupying the active array 720. Like the trigger symbols 732 and the symbol counter 733, the branch symbols 752 cause the branch symbol counter 737 to be updated. In some embodiments, the branch symbols 752 may be held on the active array 720 for one or more subsequent game cycle outcomes. In other embodiments, the branch symbols 752 are removed from the active array to present the next game cycle outcome.

Like the trigger symbols 732, the branch symbols 752 are not limited to one type of symbol, but rather make include multiple types of branch symbols 752. In some examples, the branch symbols 752 may include modified branch symbols that count as multiple branch symbols on the branch symbol counter 737 (e.g., a 'stack' of branch symbols 752 occupying one symbol position or a branch symbol 752 with a multiplier). In certain examples, the symbol positions of the active array 720 impact the type of branch symbol 752. In some embodiments, multiple branch symbol counters 737 may be active to count the different type of branch symbols 752. For example, meeting the threshold values of different branch symbol counters 737 may cause different alterations to the predefined progression path, such as skipping one, two, or three award levels.

In the example embodiment, the second state shown in FIG. 12B occurs after the branch symbol collection has met the branch condition depicted by the branch symbol counter 737. That is, in this example and through the game cycle outcome of the first state and at least one intermediate game cycle outcome, eight branch symbols 752 have been collected. As a result, the progression path has been altered to skip one award level. If the player was previously at a first award level in the first state, the progression path is modified to bypass a second award level and progress directly to a third award level. As a result, the player is linked to the third jackpot award 738 rather than the second jackpot award 736 (shown in FIG. 12A). In the example embodiment, the player immediately progresses to the third award level irrespective of the number of trigger symbols 732 collected. In other embodiments, the player may be required to still achieve the trigger condition of the award level associated with the first state before progressing to the third award level.

Progression to through the modified path results in at least one of the counters 733, 735, and 737 being set to a predefine value. The symbol counter 733 and the game cycle counter 735 may be set to initial values defined by the trigger condition of the current award level. In some embodiments, the trigger condition, award, and/or array size associated with the third award level may be swapped with the second award level or other award levels. In one example, while the award and array size increase to match the third award level, the trigger condition may be swapped with the trigger condition of the second award level.

The branch symbol counter 737 may be set to a value associated with the award level or a value based on the number of times the threshold value of the branch symbol counter 737 has been achieved in the gaming session. In the illustrated example, the symbol counter 733 is set to 18, the game cycle counter 735 is set to 3, and the branch symbol counter 737 is set to 25. However, these values are for exemplary purposes only and are not intended to limit embodiments to the illustrated values.

In addition to change the counters, the active array 720 is adjusted in at least some embodiments. In the example embodiment, the active array 720 expands based on the current award level by two additional rows of symbol positions. In other embodiments, other suitable modifications to the active array 720 may be used, including a fixed expansion irrespective of the award level. For example, the array 720 may include one additional row of symbol positions irrespective of the changes to the progression path. In this example and in contrast to the array 720 in the second state, the array 720 would only expand by one row of symbol positions.

Figure 13A:
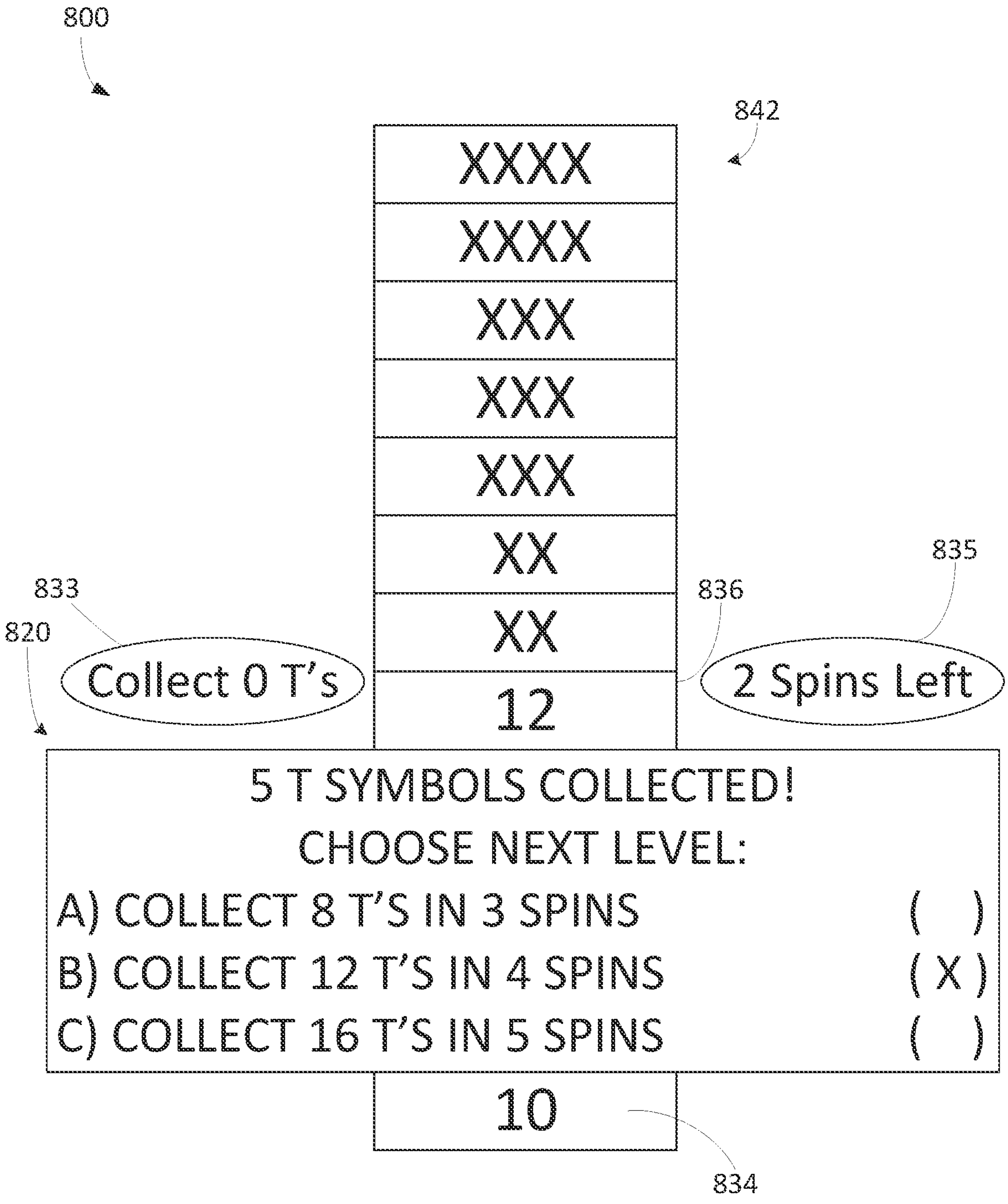
FIGS. 13A-13B depict an example game interface for a game feature including player selection for progression paths through a plurality of award levels, according to one or more embodiments of the present disclosure.
Figure 13B:
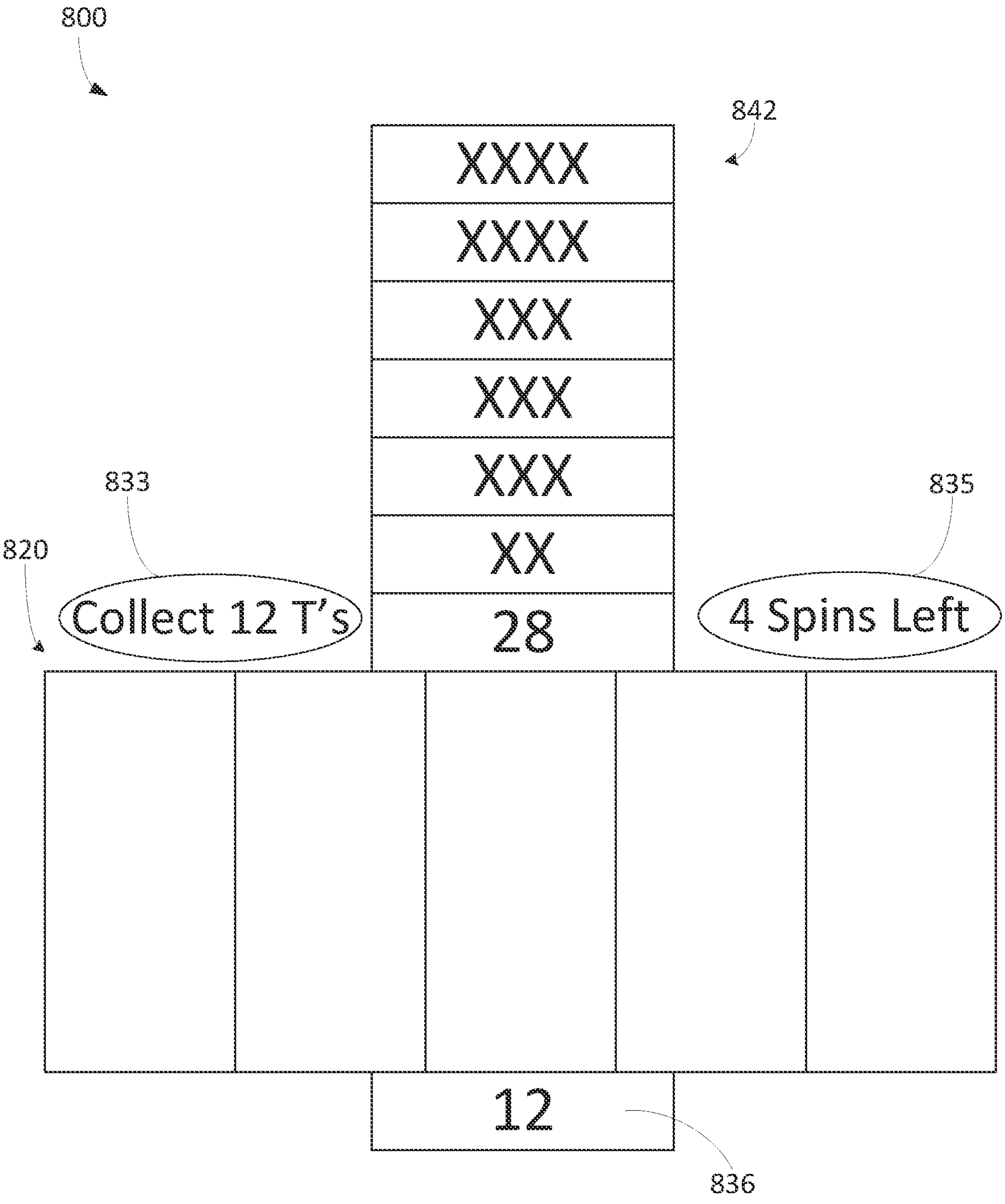

In some embodiments, changes to the predefined path are in response to player input. That is, a player is prompted to select a subsequent award level within a progression path from a plurality of available award levels. FIGS. 13A and 13B depict an example game interface 800 provided by a gaming system (e.g., the gaming system shown in FIGS. 1 and 2) for a player-selectable progression path game feature. In the example embodiment, the game interface 800 is at least partially similar to the game interfaces shown in FIGS. 5A-7B, 9, 10A-10D, and 12A-12B. More specifically, the game interface 800 includes an active array 820 of symbol positions, a symbol counter 833, a game cycle outcome counter 835, and a plurality of jackpot awards 842. In other embodiments, the game interface 800 includes additional, fewer, or alternative elements, including those described elsewhere herein.

In the example embodiment, FIG. 13A depicts the game interface 800 in a first state. In the first state, the player, who is linked to a first jackpot award 834, has collected the number of trigger symbols required by the symbol counter 833 for a second award level associated with a second jackpot award 836. In response to achieving the trigger condition, a player input prompt is presented over the active array 820. In the player input prompt, three path options are presented to the player for selection. In this example, the player is provided the option between collecting 8 trigger symbols in 3 spins (i.e., game cycle outcomes), 12 trigger symbols in 4 spins, and 16 trigger symbols in 5 spins. Additional, fewer, or alternative options may be presented to the player, including different options based on the current award level, previous selections, and/or the award associated with the upcoming award level. In certain embodiments, other suitable presentations may be used to prompt the player for player input, including player input through display devices and input devices separate from the display device presenting the game interface 800. In one example, the prompt may be presented on a touchscreen configured to present various buttons and other input elements for receiving player input.

In some embodiments, the options provided to the player include additional or alternative elements rather than selecting the number of symbols to collect within a given number of spins. In one example, the number of spins does not change between the different options, but rather the player only selects the number of symbols to be collected (e.g., the player selects whether to collect 8, 12, or 16 trigger symbols within 3 spins). In another example, the corresponding jackpot award (or other suitable award) is different for each available option. In FIG. 13A, other than the first jackpot award 834 and the second jackpot award 836 (which is awarded to the player for achieving trigger condition as seen in FIG. 13B), the remaining jackpot awards 842 are obscured. Selecting one of the available options reveals the corresponding jackpot award 842 on the game interface 800. In other embodiments, each jackpot award associated with the options is presented to facilitate player choice in which jackpot award to pursue. In a further example, the player selection may change other aspects of the game feature, such as applying modifiers to the array 820, the symbols populating the array 820, and/or the jackpot awards 842, introducing new symbols, modifying the number of game cycles provided, and/or other suitable game modifications.

In the example embodiment, the prompt shown in the first state may be presented after achieving each award level such that the player provides a selection to advance to the next award level. In other embodiments, player selection may not occur after each award level. In one example, the player selection occurs after a predetermined number of award levels. In another example, the player selection occurs in response to a game event or condition, such as collecting a number of certain symbols, detecting a particular symbol combination within the array 820, and the like. In a further example, the player may be provided the ability to manually initiate the player selection a certain number of times through the game feature.

In certain embodiments, the game interface 800 may be configured to present an automatic selection from a plurality of available options for the upcoming award level instead of receiving player input for the selection. That is, one of the available options may be randomly selected. The random selection may be initiated by the player, automatic, or occur after no player input is received for a period of time. The presentation of the automatic selection may be the same as or different from the manual selection.

In the example embodiment, the player selects the trigger condition of collecting 12 trigger symbols in 4 spins. FIG. 13B depicts the game interface 800 in a second state following the player selection in the first state. Accordingly, the symbol counter 833 and the game cycle outcome 835 are updated to reflect the selection by the player. In addition, the second jackpot award 836 is linked to the player and presented below the array 820 to visually indicate the link to the jackpot award 836. A third jackpot award 838 is revealed in the second state. In some embodiments, the jackpot value of the third jackpot award 838 is associated with the player selection. In other embodiments, the third jackpot award 838 is irrespective of the player selection and may be presented prior to the second state. The active array 820, like at least some of the foregoing embodiments, increases in array size by adding an additional row of symbol positions. In other embodiments, the active array 820 may remain fixed, expand by adding a different number and/or configuration of new symbol positions, or shrink in array size.

Play of the game feature may continue such that the player continues to collect trigger symbols until a termination condition is met (e.g., reaching the top award level or failing to collect the threshold number of trigger symbols within the predefined number of game cycle outcomes). The player may make subsequent selections to modify the progression path according to his or her preferences. In certain embodiments, the manual player input may be used to make other selections. For example, player input may be used in game features similar to the game feature shown in FIGS. 12A and 12B, where the player is prompted to select which award level to jump or branch to in response to collecting a predetermined number of branch symbols. In other embodiments, the player is provided the option to select between a plurality of awards for one or more award levels, thereby enabling the player to further customize his or her gaming session.

In some embodiments, the progression path may be modified to facilitate backwards progression through the award levels in addition to forwards progression, where "backwards" and "forwards" progression are defined by the magnitude of trigger conditions and/or associated awards of the award levels. Backwards progression may be used in embodiments in which the game feature does not conclude after failing to meet the trigger condition of an award level, but rather the player sent backwards an award level. The game feature continues until the player fails to meet the trigger condition of a first or initial award level or the player achieves the top award level.

Figure 14A:
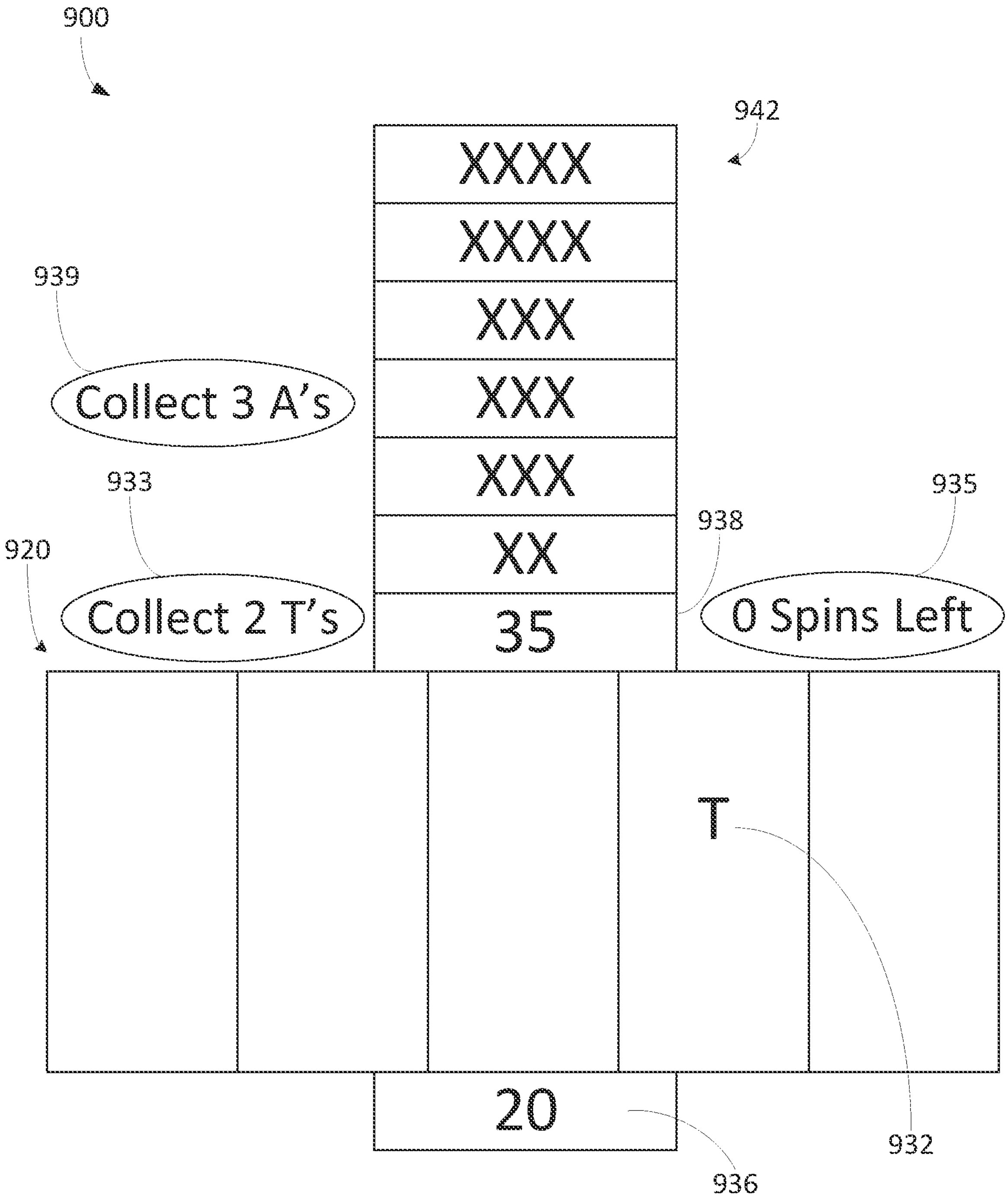
FIGS. 14A-14B depict an example game interface for a game feature including bidirectional progression paths through a plurality of award levels, according to one or more embodiments of the present disclosure.
Figure 14B:
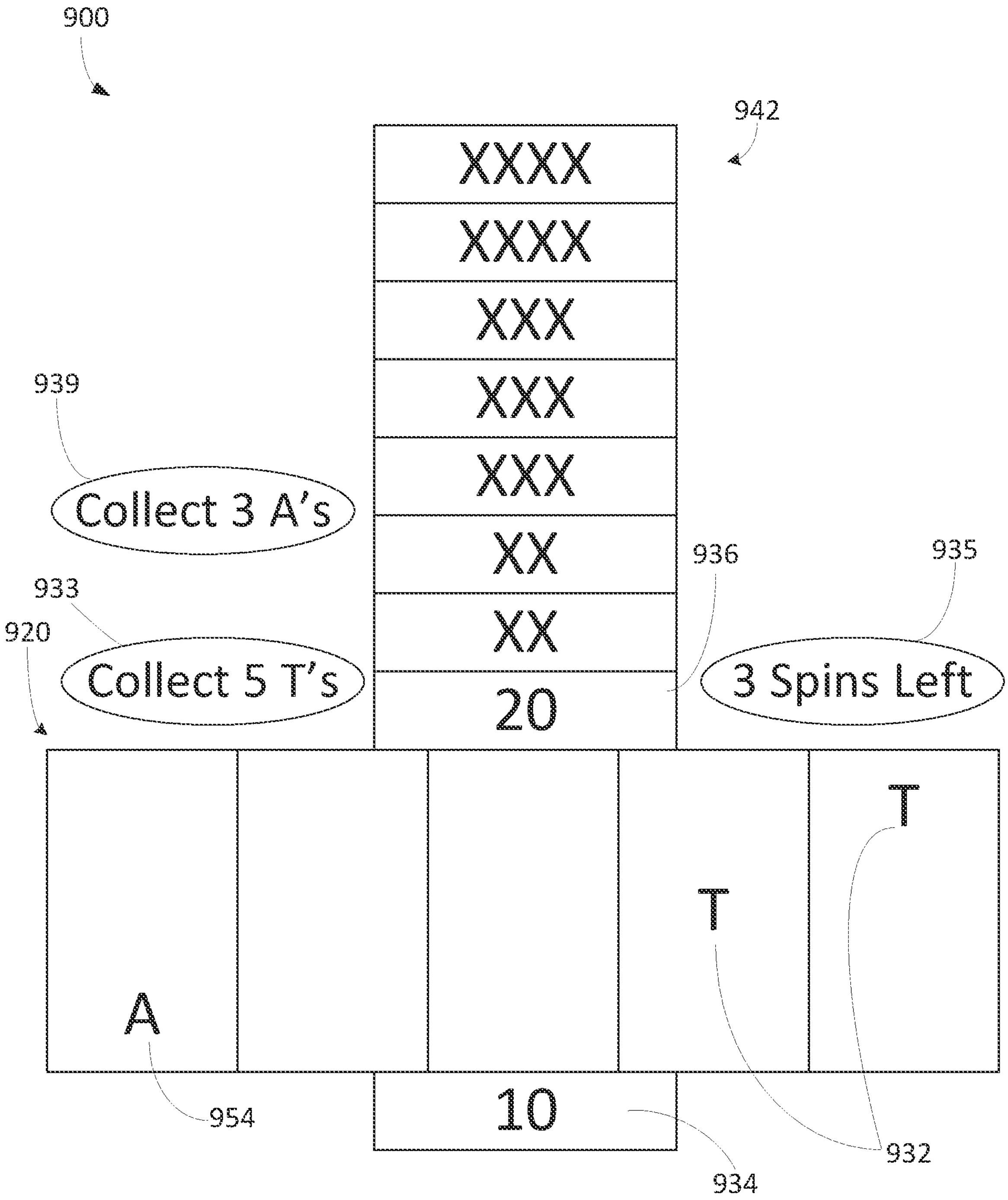

FIGS. 14A and 14B depict an example game interface 900 provided by the gaming system for an example game feature including bidirectional progression paths. In the example embodiment, the game interface 900 is substantially similar the foregoing game interfaces. That is, the game interface 900 includes an active array 920, trigger symbols 932, a symbol counter 933, a game cycle counter 935, and a set of jackpot awards 942 (including first, second, and third jackpot awards 934, 936, 938). In other embodiments, the game interface 900 includes additional, fewer, or alternative presentation elements for the game feature, including those described elsewhere herein.

FIG. 14A depicts the game interface 900 in a first state. More specifically, the player has achieved a second award level associated with the second jackpot award 936 and failed to achieve the trigger condition of the third award level associated with the third jackpot award 938 as shown by the symbol counter 933 and the game cycle outcome counter 935. In the first state, the active array 920 includes four rows and five columns of symbol positions. In some game features described herein, the game feature may conclude in response to the first state and award at least the second jackpot award 936 to the player for play of the game feature. However, in the game feature associated with FIGS. 14A and 14B, the progression path is modified to cause the player to progress backwards to a first award level in response to the first state.

FIG. 14B depicts the game interface 900 in a second state following the first state. More specifically, the player has progressed backwards from the second award level to the first award level. That is, the first jackpot award 934 is linked to the player in place of the second jackpot award 936, the trigger condition for the second award level is presented by the counters 933, 935, and the array size of the active array 920 is decreased (i.e., by removing one row of symbol positions). In other embodiments, other changes may be made to the game interface 900 and/or some of the adjusted elements of the interface 900 may remain the same between the first and second states. In one example, the array size of the active array 920 may remain the same. In another example, the trigger condition may be different from a previous trigger condition associated with the second award level.

Game cycle outcomes are generated to determine the progression through the game feature. If the trigger condition of the second award level is achieved within the game cycle outcomes, the player progresses to the second award level and the trigger condition of the third award level is initiated (i.e., similar to the first state). If the trigger condition is not achieved, play of the game feature continues with backwards progression until a termination condition is met. In the example embodiment, the second state is an initial state of the game feature and failing to achieve the trigger condition of the second award level causes the game feature to conclude. In other embodiments, other suitable termination conditions may be included within the game feature. For example, collecting certain symbols or detecting a particular game cycle outcome may be termination conditions for the game feature.

To collect one of the jackpot awards 942 beyond the first jackpot award 942, the player may be required to collect a certain number of award symbols 954 through the game feature to initiate an award sequence for at least the currently linked jackpot award 942. Collection of the award symbols 954 may be monitored on the game interface through an award symbol counter 939. Meeting or exceeding the threshold value of the award symbol counter 939 over one or more game cycle outcomes may automatically initiate the award sequence for the currently linked jackpot award (and/or other awards linked to the player). In other embodiments, the award sequence is not automatically initiated, but rather meeting or exceeding the threshold value of the award symbol counter 939 unlocks an option for the player to manually initiate the award sequence. In some embodiments, initiating the game feature may continue after the award sequence. The game feature may be reset to an initial state or remain in the same state prior to the award sequence. In other embodiments, the award sequence is a termination condition, and the game feature concludes in response to the award sequence.

In some embodiments, rather than linking different jackpot awards to the player, achieving different award levels may adjust the first jackpot award 534 and/or a maximum jackpot award associated with the top award level. That is, if the player progresses through multiple award levels only to regress to the initial award level and conclude the game feature, the player is not necessarily limited to the first jackpot award 534. Rather, progression through the award levels may increase the value of the first jackpot award 534 through aggregating award values, applying multipliers, and the like. In certain embodiments, other jackpot awards 542 may replace the first jackpot award 534, or backwards progression does not remove or replace the currently linked jackpot award.

In certain embodiments, the game feature includes "second-chance" symbols that enable a player to prevent backwards progression in response to collecting a predetermined number of second-chance symbols. Any of the symbols described herein, including the second-chance symbols, may be predefined for the functionalities described herein, or the corresponding function may be based at least in part on the symbol position occupied by each symbol. That is, the symbol positions of the array 920 may include modifiers and/or other functions that affect the functionality of the symbols populating the array 920. In one example, each symbol position has a colored background that changes the functionality of the occupying symbol according to one or more predefined rules.

Figure 15:
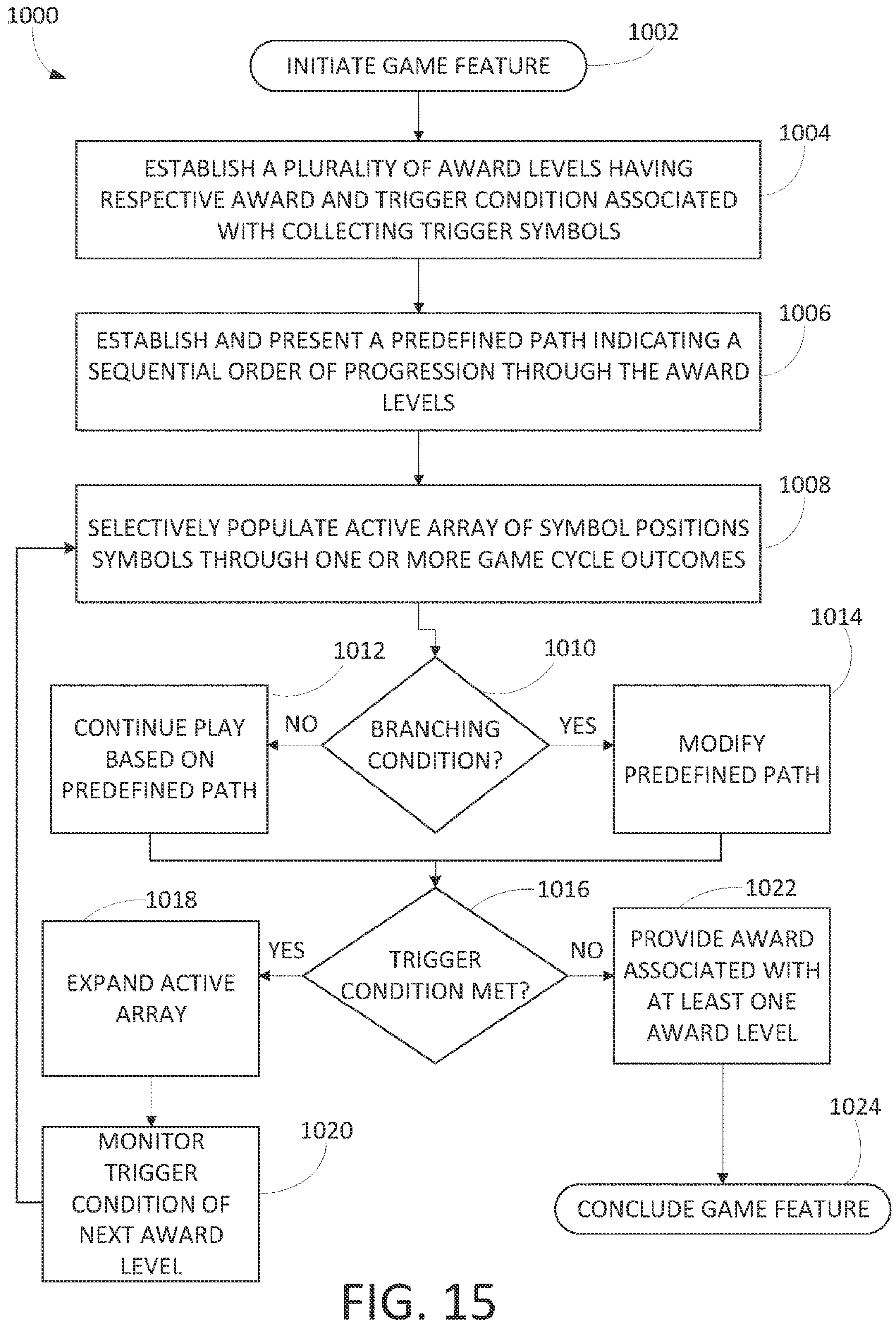
FIG. 15 depicts a flow diagram of an example method of conducting and presenting a game feature including dynamic progression through a plurality of award levels using a gaming system, according to one or more embodiments of the present disclosure.

FIG. 15 depicts a flow diagram of an example method 1000 for providing a game feature with dynamic path progression using a gaming system (e.g., the gaming system shown in FIGS. 1 and 2). More specifically, the method 1000 is performed at least partially by game-logic circuitry in communication with one or more display devices of a gaming machine to present the game elements described herein. In other embodiments, the method 1000 may be performed by other suitable devices of the gaming system and/or may include additional, fewer, or alternative steps, including those described elsewhere herein.

At step 1002, the game feature is initiated. Similar to other game features described herein, the game feature associated with the method 1000 is a bonus game feature of a game including at least a base game feature. The play of the base game feature and the initiation of the bonus game feature may be similar to the features described with respect to FIG. 8A.

At step 1004, through the initiation of the game feature, the game-logic circuitry establishes a plurality of award levels. Each award level has a respective award and a respective trigger condition. In some embodiments, the award and/or the trigger condition of at least some award levels may not be defined at step 1004 to facilitate enhanced dynamic award levels through player selection, game performance, and the like.

At step 1006, the game-logic circuitry established a predefined path for progressing through the award levels. That is, achieving trigger conditions of award levels causes the player to progress sequentially through the award levels according to the predefined path. The predefined path may be the same for each instance of the game feature, or the path may be defined at the initiation of the game feature. That is, the organization of the award levels and/or the elements of the award levels (i.e., the trigger condition and/or the award) may be defined based on one or more random determinations and/or game conditions of the base game feature.

The game-logic circuitry also causes at least one of the display devices to present a representation of at least a portion of the predefined path to the player, thereby enabling the player to readily understand the progression of the game feature. One example presentation is shown in the foregoing game interfaces, where each jackpot award represents an award level, and the path is represented by the organization of the jackpot awards (progressing from the bottom jackpot award to the top award). Other suitable presentations of the predefined path are contemplated as within the scope and spirit of the present disclosure, include presentations that only present a portion of the path to the player at a time.

At step 1008, the game-logic circuitry causes the display device to selectively populate the active array with symbols through one or more game cycle outcomes. The selective population includes randomly selecting a symbol or blank from a set of available symbols (which may include one or more blanks and/or inactive symbols). The available symbols include at least one type of trigger symbol. As set forth above, collection of the trigger symbols is used to progress through the game feature. The available symbols may include additional types of symbols, such as branching symbols, award symbols, value-bearing symbols, and the like. Some symbols may be configured to perform a plurality of functions. For example, branching symbols or award symbols may also be value-bearing symbols or one type of trigger symbol. In some embodiments, the functions of the symbols may be added or activated in response to occupying particular symbol positions within the active array. That is, the symbol positions of the active array may be divided into a plurality of zones that cause the occupying symbols to perform different functions and/or active the inactive functions of the symbols. In other embodiments, particular arrangements or combinations of symbols may activate certain functionality of the symbols. In one example, populating the active array with a particular combination of trigger symbols may initiate a modification to the predefined path as described herein. Selection of the symbols to generate the game cycle outcome is performed by the game-logic circuitry, and the game-logic circuitry then causes the display device to present the game cycle outcome.

At step 1010, the game-logic circuitry determines whether a branching condition has been detected through the one or more game cycle outcomes. The branching condition may include, for example and without limitation, collecting branching symbols, detecting a particular arrangement or combination of symbols, receiving player input to modify the predefined path, failing to meet a trigger condition, and/or other suitable events and conditions related to the game feature. Progress towards a branching condition and/or achieving a branching condition may be monitored by the player through the display device (or other presentation devices of the gaming machine). For example, collection of branching symbols may be monitored through a counter presented by the display device. The determination at step 1010 may be performed in response to each game cycle outcome or at the conclusion of the game cycle outcomes allotted to the player through the progression towards the next award level.

In some embodiments, the game feature may include a plurality of available progression paths, and the branching condition includes detecting progression through at least one of the paths. Each progression path include at least partially different sets of award levels. In one example, at least two types of trigger symbols are available to collect for two respective progression paths. Meeting a threshold value of trigger symbols for one path may close or alter at least one of the paths. In certain embodiments, the player may be prompted to provide a selection from the multiple progression paths.

If no branching condition is detected, play of the game feature continues according to the predefined path at step 1012. If, however, a branching condition is detected, the game-logic circuitry modifies the predefined path to alter the progression of the player through the award levels. The modification may include, but is not limited to, assigning new awards and/or trigger conditions to one or more award levels, reorganizing the award levels to a new order, removing award levels from the path (i.e., skipping or jumping award levels), adding new award levels, and/or enabling bidirectional progression (i.e., backwards progression) to prior award levels. In certain embodiments, the path includes inactive or locked award levels that are activated or unlocked in response to the modification. Modifying the progression path is performed automatically or at least partially manually, where player input may affect the modification to the path. The modification may be random, predefined, associated with the particular branching condition, and/or manually selected by the player. At least some embodiments of the game feature may facilitate a plurality of types of modifications, thereby enhancing the dynamic nature of the game feature.

In at least some embodiments, the modification to the progression path is presented by the display device through one or more notifications, animations, updates to presentation elements associated with the progression path, and the like. For example, in game interfaces similar to at least some of the foregoing example game interfaces, the visual presentations of the jackpot awards may be updated to reflect the modified progression path.

In some embodiments, detecting a branching condition automatically causes the player to progress to a new award level, which may reset progress towards a new trigger condition. In such embodiments, the steps 1008-1024 may be performed again for a new set of game cycle outcomes of the new trigger condition. In other embodiments, the player may still be required to achieve the current or new trigger condition to progress to the next award level of the modified path, and therefore play of the game continues to step 1016. In some embodiments, different branching conditions result in the game feature continuing automatically to a new award level or requiring the player meet the trigger symbol collection requirements of a trigger condition to progress. For example, bidirectional progression may cause the player to automatically progress to a previous award level, whereas collecting the predetermined number of branching symbols may still require to player to collect trigger symbols to progress.

In at least some embodiments, the path may be modified a plurality of times. That is, each instance of detecting a branching condition at step 1010 may cause a new modification to the progression path. At least some branching conditions may be inactivated through play of the game feature and/or based on the number of modifications to the progression path. For example, the branching conditions may be inactive while the trigger condition for the top award level is active. In certain embodiments, inactive branching conditions may provide alternative awards or modifications to the game feature, such as awarding additional game cycle outcomes.

At step 1016, the game-logic circuitry determines whether the number of collected trigger symbols matches or exceeds the threshold value defined by the trigger condition within the number of game cycle outcomes defined by the trigger condition. In some embodiments, the game-logic circuitry is configured to perform the determination of step 1016 after each game cycle outcome. In other embodiments, the determination of step 1016 is performed at the conclusion of the game cycle outcomes allocated by the trigger condition of the next award level.

If the trigger condition of the next award level has been met, the game-logic circuitry cause the display device to expand or otherwise alter the active array at step 1018. The alteration to the active array 1018 may be predefined for each time the player progresses to a new award level (e.g., adding one additional row of symbol positions). In other embodiments, the active array 1018 changes to match an array size and/or configuration associated with the achieved award level. In further embodiments, the changes to the active array are at least partially random.

At step 1020, the trigger condition of the next award level as indicated by the current progression path (which may be the predefined path or a modified path based on steps 1010-1014) is monitored by the game-logic circuitry. The monitoring may be visually indicated to the player by updating one or more counters, the presentation of the altered active array, and/or the visual representation of the award levels. In at least some embodiments, the functions of step 1020 also include linking the player to the jackpot award associated with the achieved award level. Additional or alternative awards of the award level may also be linked to the player or automatically applied (e.g., additional game cycle outcomes may be automatically added to the game cycle outcome counter). In other embodiments, particularly embodiments with bidirectional progression, the awards of the achieved award level may be at least partially applied to a preexisting award linked to the player or a credit balance of the player.

After steps 1018 and 1020, the player is allocated at least one additional game cycle outcome to achieve the threshold value of trigger symbols as defined by the newly monitored trigger condition, and therefore play of the game feature progresses again starting at step 1008 for the newly allocated game cycle outcomes. As mentioned above, in some embodiments, the steps 1018 and 1020 may not be limited to occurring in response to the determination at step 1016. More specifically, in such embodiments, modifying the predefined path in step 1014 may automatically initiate the functions of steps 1018 and 1020.

If the determination step 1016 determines that a trigger condition has not been met within the game cycle outcomes allocated through the trigger condition, the game feature progresses to a termination condition in some embodiments. More specifically, the game-logic circuitry causes the display device to present an award sequence at step 1022 to provide an award associated with one or more award levels to the player. In the example embodiment, the jackpot award linked to the player is provided. Following the award sequence, the game feature is concluded at step 1024. Concluding the game feature may include initiating or resuming a base game feature. The game feature may be initiated again in response to one or more bonus game trigger events detected within the base game feature and/or other features of the game. In some embodiments, the game feature may be immediately reinitiated at the conclusion of the game feature such that the method 1000 repeats.

In other embodiments, particularly embodiments with bidirectional progression, the determination at step 1016 may not result in a termination condition being met. That is, the game feature may continue through steps 1018 and 1020 to progress to a previous award level. In some examples, the backwards progression is not to a prior award level, but rather to a different award level have a relatively lower jackpot award and/or trigger condition. The termination condition in such embodiments may be met if the current award level is an initial award level and/or cannot progress backwards any further. At this point, the determination at step 1016 may progress to the steps 1022 and 1024.

It is to be understood that the steps of method 1000 are presented in a particular order for illustrative purposes only and is not intended to limit the method 1000 to this particular sequence of steps. That is, in some embodiments, at least some of the steps of the method 1000 may be performed in a different order and/or in parallel to other steps. For example, the determinations at steps 1010 and 1016 may occur in parallel after each game cycle outcome. For steps occurring in parallel that having overlapping effects or functionality, the game-logic circuitry may be configured to define a hierarchy of these steps. For example, detecting a branching condition and detecting achievement of a trigger condition on the same game cycle outcome may result in the game-logic circuitry prioritizing the branching condition to progress through the modified progression path rather than the predefined path.

The embodiments of the present invention provide innovative procedures for aggregating values of symbols in a symbol array and applying dynamic modifiers. Game-logic circuitry executing instructions in accordance with the embodiments present a visual display of spinning reels with clearly enumerated symbology that combine in readily understood arrangements to increase in value. An observer experiences excitement and anticipation as new symbols land in the array and aggregate values are summed and displayed. In stark contrast to conventional reel-spinning games in which symbol images are evaluated for winning combinations by paytable rules, the disclosed embodiments provide immediately recognizable values in WYSIWYG display configurations while adding variability as to how the values to be awarded to the player are selected and accumulated.

The value-aggregation and dynamic path progression procedures may be symbol- and game-agnostic. Themes and imagery of symbols and environment may be varied with no effect on the value-aggregation and dynamic path progression processes. Or, if so desired, the criteria for value-aggregation and dynamic path progression may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated-all this adds to processing overhead. Special symbols like wilds, multipliers, and scatter symbols can modify paytable values and may require separate, additional evaluation according to customized rule sets. All these procedures can be inherently more complex than simple aggregation (i.e., addition) of number values. The embodiments disclosed herein represents a win-win: simpler, almost self-explanatory graphics combined with faster, more efficient processing. The inventive value-aggregation and dynamic path progression procedures through symbol collection can be implemented on the vast majority of casino gaming machines without requiring upgrades or modifications.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming system comprising:

a gaming machine including an electronic display device configured to display an active array of symbol positions; and game-logic circuitry configured to:

establish a plurality of award levels including a first award level and a second award level, each award level of the plurality of award levels having a respective trigger condition associated with a number of trigger symbols and a corresponding array size;

cause the electronic display device to present a predefined path associated with the plurality of award levels and present respective award indicia that visually indicates an award value for each award level of the predefined path, the predefined path initially defining a sequential order of progression through the plurality of award levels, wherein progression from the first award level is to the second award level based on the predefined path;

cause the electronic display device to selectively populate the active array of symbol positions with one or more symbols through one or more game cycle outcomes associated with the first award level, the active array having the array size associated with the first award level;

cause the electronic display device to collect trigger symbols within the one or more game cycle outcomes;

in response to detecting a branching condition within the one or more game cycle outcomes, cause the electronic display device to visually update the predefined path to a modified path, wherein progression from the first award level is altered to a third award level of the plurality of award levels based on and visually indicated by the modified path;

in response to establishing the modified path and achieving the trigger condition associated with the first award level based on the collected trigger symbols, progress from the first award level to the third award level by causing the electronic display device to: (i) animate the active array to visually transition to a modified active array having the array size corresponding to the third award level, (ii) animate the modified path to transition from the first award level to the third award level, and (iii) repeat the selective population for one or more additional game cycle outcomes with the modified active array, wherein none of the trigger symbols that appear in the active array are carried over to the modified active array; and cause the electronic display device to present an award sequence associated with an award of at least one award level of the plurality of award levels based on any trigger conditions achieved and the award indicia associated with the at least one award level.

2. The gaming system of claim 1, wherein the branching condition includes collecting a predetermined number of branching symbols selectively populating the active array through at least the one or more game cycle outcomes.

3. The gaming system of claim 2, wherein the predetermined number of branching symbols are associated with the third award level and a predetermined number of secondary branching symbols are associated with a fourth award level of the plurality of award levels, and wherein collecting the predetermined number of secondary branching symbols causes the predefined path to be modified to progress to the fourth award level from the first award level.

4. The gaming system of claim 1, wherein the branching condition includes failing to collect a predetermined number of trigger symbols within the one or more game cycle outcomes.

5. The gaming system of claim 1, wherein the game-logic circuitry is configured to cause the gaming machine to prompt player selection of an award level, and wherein the branching condition includes receiving player input indicating selection of the third award level.

6. The gaming system of claim 5, wherein the player input establishes at least one of the award or the trigger condition for the third award level.

7. The gaming system of claim 1, wherein the third award level is added to the plurality of award levels in response to the branching condition.

8. A method of conducting and presenting a game using a gaming system, the gaming system comprising game-logic circuitry and a gaming machine, the gaming machine including an electronic display device configured to display an active array of symbol positions, the method comprising:

establishing, by the game-logic circuitry, a plurality of award levels including a first award level and a second award level, each award level of the plurality of award levels having a respective trigger condition associated with a number of trigger symbols and a corresponding array size;

causing, by the game-logic circuitry, the electronic display device to present a predefined path associated with the plurality of award levels and present respective award indicia that visually indicates an award value for each award level of the predefined path, the predefined path initially defining a sequential order of progression through the plurality of award levels, wherein progression from the first award level is to the second award level based on the predefined path;

causing, by the game-logic circuitry, the electronic display device to selectively populate the active array of symbol positions with one or more symbols through one or more game cycle outcomes associated with the first award level, the active array having the array size associated with the first award level;

causing, by the game-logic circuitry, the electronic display device to collect trigger symbols within the one or more game cycle outcomes;

causing, by the game-logic circuitry in response to detecting a branching condition within the one or more game cycle outcomes, the electronic display device to update the predefined path to a modified path, wherein progression from the first award level is altered to a third award level of the plurality of award levels based on the modified path;

progressing, by the game-logic circuitry in response to establishing the modified path and achieving the trigger condition associated with the first award level based on the collected trigger symbols, from the first award level to the third award level by causing the electronic display device to: (i) animate the active array to visually transition to a modified active array having the array size corresponding to the third award level, (ii) animate the modified path to transition from the first award level to the third award level, and (iii) repeat the selective population for one or more additional game cycle outcomes with the modified active array, wherein none of the trigger symbols that appear in the active array are carried over to the modified active array; and causing, by the game-logic circuitry, the electronic display device to present an award sequence associated with an award of at least one award level of the plurality of award levels based on any trigger conditions achieved and the award indicia associated with the at least one award level.

9. The method of claim 8, wherein the branching condition includes collecting a predetermined number of branching symbols selectively populating the active array through at least the one or more game cycle outcomes.

10. The method of claim 8, wherein the branching condition includes failing to collect a predetermined number of trigger symbols within the one or more game cycle outcomes.

11. The method of claim 8 further comprising causing, by the game-logic circuitry, the gaming machine to prompt player selection of an award level, wherein the branching condition includes receiving player input indicating selection of the third award level.

12. The method of claim 8, wherein the third award level is added to the plurality of award levels in response to the branching condition.

13. The method of claim 8, wherein updating the predefined path to the modified path includes removing the second award level from the modified path.

14. The method of claim 8, wherein a plurality of branching conditions is monitored through at least the one or more game outcomes, each branching condition of the plurality of branching conditions associated with a respective modified path.

15. A gaming machine, the gaming machine comprising:

an electronic display device configured to display an active array of symbol positions; and game-logic circuitry configured to:

establish a plurality of award levels including a first award level and a second award level, each award level of the plurality of award levels having a respective trigger condition associated with a number of trigger symbols and a corresponding array size;

cause the electronic display device to present a predefined path associated with the plurality of award levels and present respective award indicia that visually indicates an award value for each award level of the predefined path, the predefined path initially defining a sequential order of progression through the plurality of award levels, wherein progression from the first award level is to the second award level based on the predefined path;

cause the electronic display device to selectively populate the active array of symbol positions with one or more symbols through one or more game cycle outcomes associated with the first award level, the active array having the array size associated with the first award level;

cause the electronic display device to collect trigger symbols within the one or more game cycle outcomes;

in response to detecting a branching condition within the one or more game cycle outcomes, cause the electronic display device to visually update the predefined path to a modified path, wherein progression from the first award level is altered to a third award level of the plurality of award levels based on and visually indicated by the modified path;

in response to establishing the modified path and achieving the trigger condition associated with the first award level based on the collected trigger symbols, progress from the first award level to the third award level by causing the electronic display device to: (i) animate the active array to visually transition to a modified active array having the array size corresponding to the third award level, iii) animate the modified path to transition from the first award level to the third award level, and (iii) repeat the selective population for one or more additional game cycle outcomes with the modified active array, wherein none of the trigger symbols that appear in the active array are carried over to the modified active array; and cause the electronic display device to present an award sequence associated with an award of at least one award level of the plurality of award levels based on any trigger conditions achieved and the award indicia associated with the at least one award level.

16. The gaming machine of claim 15, wherein the branching condition includes collecting a predetermined number of branching symbols selectively populating the active array through at least the one or more game cycle outcomes.

17. The gaming machine of claim 16, wherein the predetermined number of branching symbols are associated with the third award level and a predetermined number of secondary branching symbols are associated with a fourth award level of the plurality of award levels, and wherein collecting the predetermined number of secondary branching symbols causes the predefined path to be modified to progress to the fourth award level from the first award level.

18. The gaming machine of claim 15, wherein the third award level is added to the plurality of award levels in response to the branching condition.

19. The gaming machine of claim 15, wherein the modified path includes swapping at least one of the respective trigger conditions or the corresponding array sizes between the second award level and the third award level.

20. The gaming machine of claim 15, wherein the branching condition includes detecting, within one of the one or more game outcomes, a predefined combination of symbols occupying the active array.

* * * * *